US010887069B2

(12) United States Patent
Xu

(10) Patent No.: US 10,887,069 B2
(45) Date of Patent: Jan. 5, 2021

(54) METHODS AND APPARATUSES FOR CONFIGURING A CONTROL RESOURCE SET IN A WIRELESS COMMUNICATION SYSTEM

(71) Applicant: GUANGDONG OPPO MOBILE TELECOMMUNICATIONS CORP., LTD., Guangdong (CN)

(72) Inventor: Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/591,855

(22) Filed: Oct. 3, 2019

(65) Prior Publication Data

US 2020/0036497 A1 Jan. 30, 2020

Related U.S. Application Data

(63) Continuation of application No. PCT/CN2018/079894, filed on Mar. 21, 2018.
(Continued)

(51) Int. Cl.
*H04L 5/00* (2006.01)
*H04W 72/04* (2009.01)

(52) U.S. Cl.
CPC .......... *H04L 5/0053* (2013.01); *H04L 5/0048* (2013.01); *H04W 72/042* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2013/0044727 A1* 2/2013 Nory .................... H04L 5/0092
370/330
2013/0230017 A1* 9/2013 Papasakellariou ..........................
H04W 72/0406
370/330
(Continued)

FOREIGN PATENT DOCUMENTS

| CN | 103713583 | 4/2014 |
| CN | 104170300 | 11/2014 |

(Continued)

OTHER PUBLICATIONS

WIPO, ISR for PCT/CN2018/079894, dated Jun. 5, 2018.
(Continued)

*Primary Examiner* — Scott M Sciacca
(74) *Attorney, Agent, or Firm* — Hodgson Russ LLP

(57) ABSTRACT

Methods and apparatuses for configuring a control resource set and a search space corresponding thereto in a wireless communication system, the method including transmitting a configuration of a control resource set and transmitting a control channel on the control resource set in accordance with the configuration of the control resource set. The control resource set is in a control region including time and frequency resources. The configuration of the control resource set includes: an indication of a starting symbol of the search space in the control resource set, an indication of a number of symbols of the control resource set, an indication of physical resource blocks (PRBs) in the control resource set, and an indication of CCE to resource element group (REG) mapping.

20 Claims, 17 Drawing Sheets

Related U.S. Application Data

(60) Provisional application No. 62/480,702, filed on Apr. 3, 2017.

(56) References Cited

U.S. PATENT DOCUMENTS

| | | | |
|---|---|---|---|
| 2015/0131605 A1* | 5/2015 | Nogami | H04L 27/2626 370/330 |
| 2018/0124744 A1* | 5/2018 | Xue | H04W 72/005 |
| 2018/0183551 A1* | 6/2018 | Chou | H04L 5/001 |
| 2018/0198650 A1* | 7/2018 | Nogami | H04L 1/0003 |
| 2018/0227156 A1* | 8/2018 | Papasakellariou | H04L 5/0053 |
| 2018/0279135 A1* | 9/2018 | Hwang | H04L 1/1861 |
| 2019/0037540 A1* | 1/2019 | Seo | H04L 5/0053 |
| 2019/0268208 A1* | 8/2019 | Seo | H04L 27/26 |
| 2019/0356524 A1* | 11/2019 | Yi | H04B 7/0695 |
| 2020/0021419 A1* | 1/2020 | Taherzadeh Boroujeni | H04L 5/0007 |

FOREIGN PATENT DOCUMENTS

| | | |
|---|---|---|
| CN | 104704750 | 6/2015 |
| CN | 104737487 | 6/2015 |
| WO | 2017052458 | 3/2017 |
| WO | 2010140828 | 12/2020 |

OTHER PUBLICATIONS

Ericsson et al., "WF on REG to CCE Mapping for NR-PDCCH," 3GPP TSG RAN1 Meeting#88bis, R1-1706318, Apr. 2017, 3 pages.

LG Electronics et al., "WF on resource mapping for NR-PDCCH," 3GPP TSG RAN1 #88bis, R1-1706286, Apr. 2017, 3 pages.

Guangdong Oppo Mobile Telecom, "PDCCH CORESET configuration and UE procedure on NR-PDCCH", 3GPP Draft; R1-1710150, 3rd Generation Partnership Project (3GPP), Jun. 16, 2017.

Mediatek Inc., "Design of Search Space", 3GPP Draft; R1-170444 Design of Search Space Final, 3rd Generation Partnership Project (3GPP), Apr. 2, 2017.

Guangdong Oppo Mobile Telecom, "Impact on common channel reception to PDCCH design", 3GPP Draft; R1-1704616, 3rd Generation Partnership Project (3GPP), Apr. 2, 2017.

Qualcomm Incorporated, "PDCCH structure", 3GPP Draft; R1-1705603 PDCH Structure, 3rd Generation Partnership Project (3GPP), Apr. 2, 2017.

European Patent Office, Search Report of Appl. No. EP18780743.3, dated Feb. 17, 2020.

ISDEC, Office Action for CA Application No. 3058781, dated Nov. 13, 2020.

SIPO, First Office Action for CN Application No. 201911316052.9, dated Nov. 3, 2020.

* cited by examiner

METHODS AND APPARATUSES FOR CONFIGURING A CONTROL RESOURCE SET IN A WIRELESS COMMUNICATION SYSTEM

CROSS REFERENCE TO RELATED APPLICATIONS

The present application is a continuation of International Application No. PCT/CN2018/079894, filed Mar. 21, 2018, which claims priority to U.S. Provisional Application No. 62/480,702, filed on Apr. 3, 2017, the entire disclosures of which are incorporated herein by reference.

TECHNICAL FIELD

The present application relates to communication systems and, more particularly, to methods and apparatuses for configuring a control resource set in a wireless communication system.

BACKGROUND

In a long term evolution (LTE) system, a control region spanning over several orthogonal frequency-division multiplexing (OFDM) symbols and several frequency subcarriers may be allocated for transmission of a physical downlink control channel (PDCCH). A resource element is defined as the smallest resource structure, covering one subcarrier over one OFDM symbol. Multiple resource elements form a resource element group (REG). A PDCCH is carried by one or multiple control channel elements (CCE), each including a number of REGs, depending on the size of payload and channel quality. The REGs of different PDCCHs may be interleaved and spread across the whole control region to achieve time and frequency gain. Because a user device may not know which REGs carry PDCCH information intended for it, the user device may need to blindly decode possible REGs to receive the user device's PDCCH before receiving the user device's user data in the same subframe. Blind decoding is complicated and requires a large amount of calculation.

In a radio system, such as the fifth generation (5G) radio system, a similar channel structure may be used for PDCCH. A radio system may be deployed at a higher frequency (e.g., above 6 GHz), at which wide bandwidths are available. Some techniques, such as beamforming (BF), could be adopted in the radio system. A PDCCH in a radio system may likewise include CCEs, each CCE including a set of REGs. But configuration of control resource sets and co-existence of different resource sets with different attributes may become challenging. For example, analog BF may require all the REGs of a PDCCH transmitted by one beam to be on one OFDM symbol and those transmitted by different beams to be on different OFDM symbols. These techniques require flexible PDCCH candidates and search spaces to reduce a user device's PDCCH blind decoding complexity.

SUMMARY

Embodiments of the present application provide improved methods and apparatuses for control resource configurations in wireless communication systems.

These embodiments include a method for configuring a control resource set and a search space corresponding thereto in a wireless communication system. The method includes transmitting a configuration of a control resource set, wherein the control resource set is in a control region including time and frequency resources, and the configuration of the control resource set includes: an indication of a starting symbol of the search space in the control resource set, an indication of a number of symbols of the control resource set, an indication of physical resource blocks (PRBs) in the control resource set, and an indication of CCE to resource element group (REG) mapping; and transmitting a control channel on the control resource set in accordance with the configuration of the control resource set.

These embodiments also include a method for a user device in a wireless communication system. The method includes receiving a configuration of a control resource set and a search space corresponding thereto, wherein the control resource set is in a control region including time and frequency resources, and the configuration of the control resource set includes: an indication of a starting symbol of the search space in the control resource set, an indication of a number of symbols of the control resource set, an indication of physical resource blocks (PRBs) in the control resource set, and an indication of CCE to resource element group (REG) mapping; and detecting a control channel on the control resource set in accordance with the configuration of the control resource set.

These embodiments further include a network apparatus. The network apparatus includes a memory storing instructions and a processor communicatively coupled to the memory, wherein the instructions, when executed by the processor, cause the network apparatus to perform operations including: transmitting a configuration of a control resource set, wherein the control resource set is in a control region including time and frequency resources, and the configuration of the control resource set includes: an indication of a starting symbol of a search space in the control resource set, an indication of a number of symbols of the control resource set, an indication of physical resource blocks (PRBs) in the control resource set, and an indication of CCE to resource element group (REG) mapping; and transmit a control channel on the control resource set according to the configuration of the control resource set.

These embodiments also include a user device. The user device includes a memory storing instructions and a processor communicatively coupled to the memory, wherein the instructions, when executed by the processor, cause the processor to perform operations including: receiving a configuration of a control resource set and a search space corresponding thereto, wherein the control resource set is in a control region including time and frequency resources, and the configuration of the control resource set includes: an indication of a starting symbol of the search space in the control resource set, an indication of a number of symbols of the control resource set, an indication of physical resource blocks (PRBs) in the control resource set, and an indication of CCE to resource element group (REG) mapping; and detecting a control channel on the control resource set in accordance with the configuration of the control resource set.

These embodiments further include a non-transitory computer-readable medium storing instructions that are executable by one or more processors of an apparatus to perform a method for configuring a control resource set and a search space corresponding thereto in a wireless communication system. The method includes transmitting a configuration of a control resource set, wherein the control resource set is in a control region including time and frequency resources, and the configuration of the control resource set includes: an indication of a starting symbol of the search space in the control resource set, an indication of a number of symbols of the control resource set, an indication of physical resource blocks (PRBs) in the control resource set, and an indication of CCE to resource element group (REG) mapping; and transmit a control channel on the control resource set in accordance with the configuration of the control resource set.

These embodiments also include a non-transitory computer-readable medium storing instructions that are executable by one or more processors of an apparatus to perform a method for a wireless communication device. The method includes receiving a configuration of a control resource set and a search space corresponding thereto, wherein the control resource set is in a control region including time and frequency resources, and the configuration of the control resource set includes: an indication of a starting symbol of the search space in the control resource set, an indication of a number of symbols of the control resource set, an indication of physical resource blocks (PRBs) in the control resource set, and an indication of CCE to resource element group (REG) mapping; and detecting a control channel on the control resource set according to the configuration of the control resource set.

It is to be understood that the foregoing general description and the following detailed description are exemplary and explanatory only, and are not restrictive of the invention, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
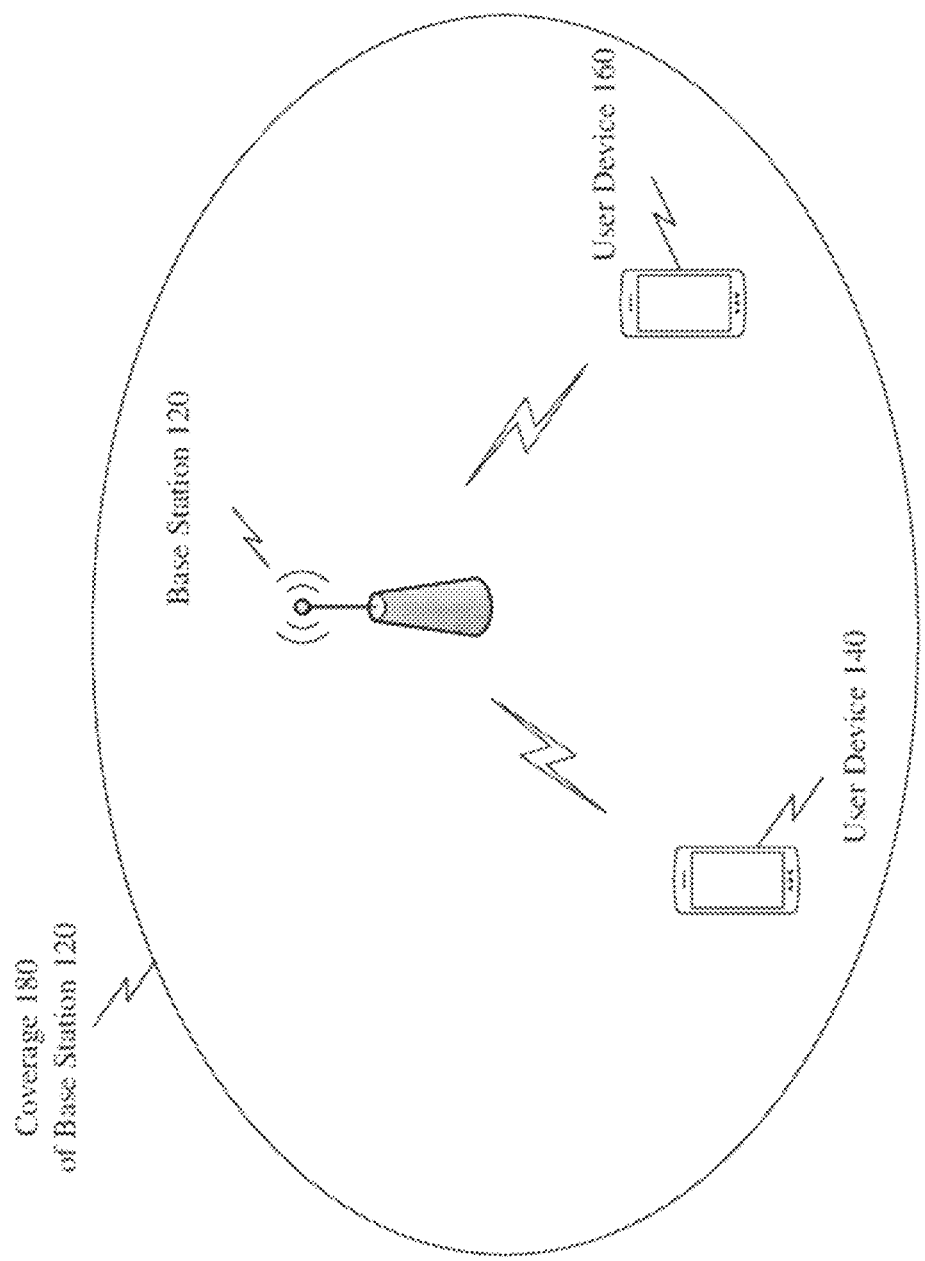
FIG. 1 illustrates an exemplary wireless communication system, according to some embodiments of the present application.

FIG. 1 illustrates an exemplary wireless communication system, consistent with embodiments of the present application. The wireless communication system includes a base station 120, a user device 140, and a user device 160. Base station 120 is an end node of a wireless communication network. For example, base station 120 may be an evolved node B (eNB) in an LTE system or a gNB in a 5G radio system. Base station 120 transmits radio signals carrying system information of the wireless communication system. A user device within a coverage 180 around base station 120 receives the system information. For example, user device 140 within coverage 180 receives the system information, and can access network services through base station 120.

Each of user devices 140 and 160 is a mobile terminal in the wireless communication network. For example, user device 140 or 160 may be a smart phone, a network interface card, or a machine type terminal. As another example, user device 140 or 160 may be a user equipment in the LTE system or the 5G radio system. Each of user devices 140 and 160 and base station 120 contain communication units that can transmit and receive radio signals. The following description discusses aspect of operating user device 140 in the wireless communication system, it being understood that such description also applies to user device 160.

When user device 140 intends to access network services through base station 120, user device 140 may need to receive control signals from base station 120 to collect system information with coverage 180, such as synchronization and radio resource allocation and schedule. For example, user device 140 in the 5G radio system may need to receive a PDCCH to learn whether any data in a physical downlink shared channel is transmitted to user device 140. Accordingly, user device 140 needs to detect a PDCCH among signals transmitted by base station 120.

A 5G radio system, for example, uses OFDM waveform for wireless communications. As in existing LTE cellular networks, communications are measured in time frames, each frame being divided into slots, and each slot containing multiple OFDM symbols each spanning over the multiple frequency subcarriers. Resources are defined in time (OFDM symbols) and frequency (subcarriers).

A PDCCH search space is a set of resources that a user device, e.g., 140, may assume as its PDCCH candidates and attempt to search and decode to obtain control information. Without loss of generality, for a user device, the instances of resources where PDCCHs are configured to be transmitted (or the instances that the user device is configured to monitor its PDCCH) are called scheduling (or PDCCH) instances hereinafter. User device 140 may conduct blind decoding of all the PDCCH instances in its search space until it successfully decodes its PDCCH candidate. Once PDCCH is successfully decoded, user device 140 proceeds to receive and decode data transmitted from the base station on a data channel such as a physical downlink shared channel (PDSCH). If user device 140 fails to decode a PDCCH in its search space, user device 140 may assume no PDCCH is transmitted at that scheduling instance and may not decode its PDSCH.

The 5G radio system may be deployed at a higher frequency (e.g., above 6 GHz), at which wide bandwidths are available. Beamforming (BF), for example, can be adopted to improve signal strength and reduce interference in the radio system.

Figure 2:
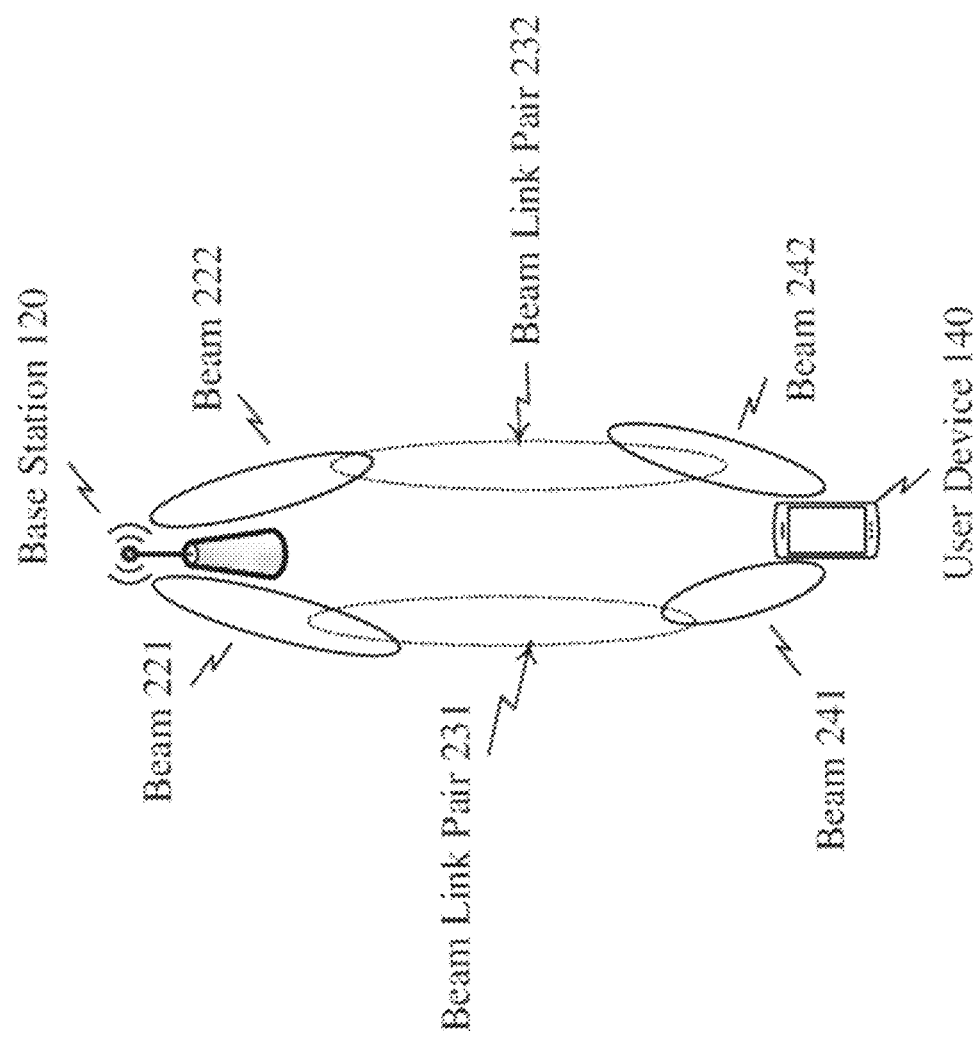
FIG. 2 is a schematic diagram of an exemplary beam link pair in a wireless communication system, according to some embodiments of the present application.

FIG. 2 is a schematic diagram of an exemplary beam link pair in the wireless communication system, according to some embodiments of the present application. In the 5G radio system, both a base station and a user device may transmit BF and receive BF to increase the BF gain. As shown in FIG. 2, base station 120 transmits beams 221 and 222, and user device 140 receives beams 241 and 242. Transmitted beam 221 and received beam 241 form a beam link pair (BLP) 231. Likewise, transmitted beam 222 and received beam 242 form a beam link pair (BLP) 232. Reception performance of BLP 231 may be different than that of BLP 232.

Through analog BF technique, the base station may transmit a whole OFDM symbol on the same beam. To ensure the user device can receive its PDCCH, the base station transmits the PDCCH by different beams at different time for the user device. For example, base station 120 may transmit a PDCCH for user device 140 by beam 221 on the first symbol and/or by beam 222 on the second symbol. User device 140 may receive its PDCCH by beam 241 through BLP 231 and/or by beam 242 through BLP 232.

Base station 120 may dynamically switch between transmission beams and between symbols to adapt to different channel conditions for PDCCH transmission. Thus, base station 120 may not provide real-time information about PDCCH transmission beams and symbols for the user device. In other words, PDCCH transmission beams 221 and 222 and symbols may be transparent to user device 140. Without knowing transmission beams 221 and 222 and symbols, user device 140 can detect and receive its PDCCH through beams 241 and 242 on control resource candidates.

Accordingly, base station 120 configures one or more control resource sets (CORESETs) including resource candidates for PDCCH transmission. To improve PDCCH transmission, a CORESET may include control resources on the same or different BLPs. PDCCHs can be transmitted in a flexible manner, with the CORESETs configured at a symbol level, a slot level, or a multi-slot level. Consistent with embodiments of the present disclosure, a CORESET can be defined as a set of radio resources where a PDCCH search space of user device 140 may be located. The CORESET of user device 140 can be user-device specific, and differ from user device to user device. Alternatively, a CORESET can be defined as a search space for multiple user devices. For a user device perspective, it may receive configuration of one or more CORESETs, and search for its PDCCH in these CORESETs accordingly.

Figure 3:
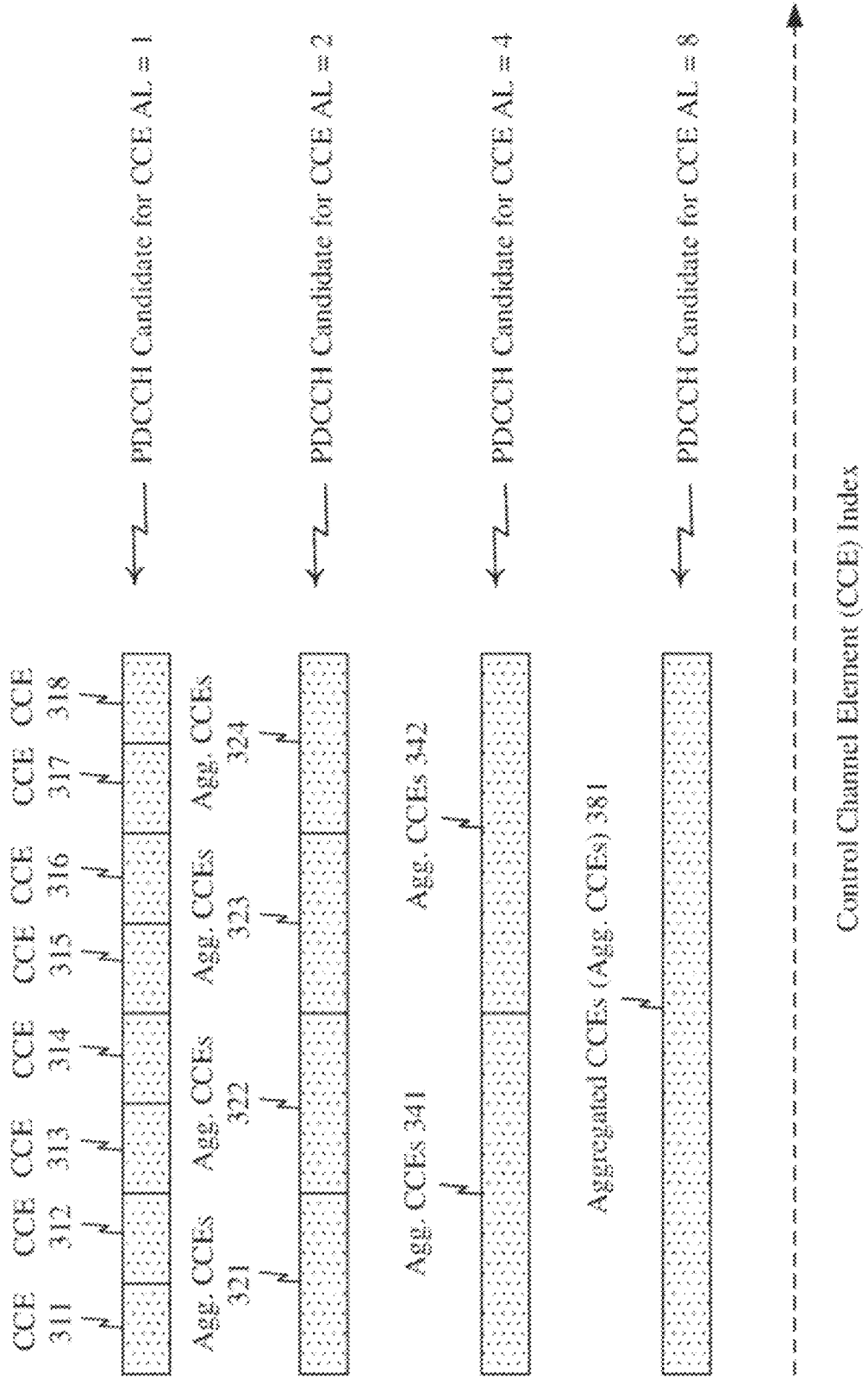
FIG. 3 is a schematic diagram of an exemplary control channel candidate in a wireless communication system, according to some embodiments of the present application.

FIG. 3 is a schematic diagram of an exemplary control channel candidate in a wireless communication system, according to some embodiments of the present application. In the 5G radio system, for example, base station 120 configures a PDCCH to include one or more CCEs, each CCE including a set of REGs. Base station 120 may need to configure different CCE aggregation levels (AL) to adapt to different performance requirement for PDCCH. For each CCE AL, there are a number of PDCCH candidates. A PDCCH candidate is a set of time-frequency resource element (REs).

For example, as shown in FIG. 3, with CCE AL=1, base station 120 configures CCEs 311-318, each being a PDCCH candidate and including a plurality of REs. In such case, base station 120 transmits a PDCCH with CCE AL=1 using one of CCEs 311-318 according to the payload size and channel conditions. With CCE AL=2, base station 120 configures aggregated CCEs (Agg. CCEs) 321-324, each being a PDCCH candidate and including two CCEs. In such case, base station 120 transmits a PDCCH with CCE AL=2 using one of Agg. CCEs 321-324 according to the payload size and channel conditions. With CCE AL=4, base station 120 configures Agg. CCEs 341 and 342, each being a PDCCH candidate and including four CCEs. In such case, base station 120 transmits a PDCCH with CCE AL=4 using one of Agg. CCEs 341 and 342 according to the payload size and channel conditions. With CCE AL=8, base station 120 configures Agg. CCEs 381, each being a PDCCH candidate and including eight CCEs. In such case, base station 120 transmits a PDCCH with CCE AL=8 using an Agg. CCEs 381 according to the payload size and channel conditions.

Moreover, base station 120 may configure different PDCCH candidates with different CCE ALs and configure all or some of these PDCCH candidates on the same time-frequency REs. For example, as shown FIG. 3, base station 120 may configure a plurality of PDCCH candidates with CCE AL=1, 2, 4, 8 in a CORESET. The CORESET includes CCEs 311-318, Agg. CCEs 321-324, Agg. CCEs 341 and 342, Agg. CCEs 381. Base station 120 configures these CCEs and Agg. CCEs all or partially overlapped with each other on REs. For example, base station 120 may configure all CCEs and Agg. CCEs of FIG. 3 on the same eight times of REs of a CCE.

When scheduling resources for user device 140 through a PDCCH, base station 120 may select one or more CCE ALs that can provide one or more PDCCH candidates to accommodate the required payload of the PDCCH, considering signal robustness under channel conditions at that time. User device 140 detects and/or decodes those one or more PDCCH candidates in its search space to find and receive its PDCCH.

Figure 4:
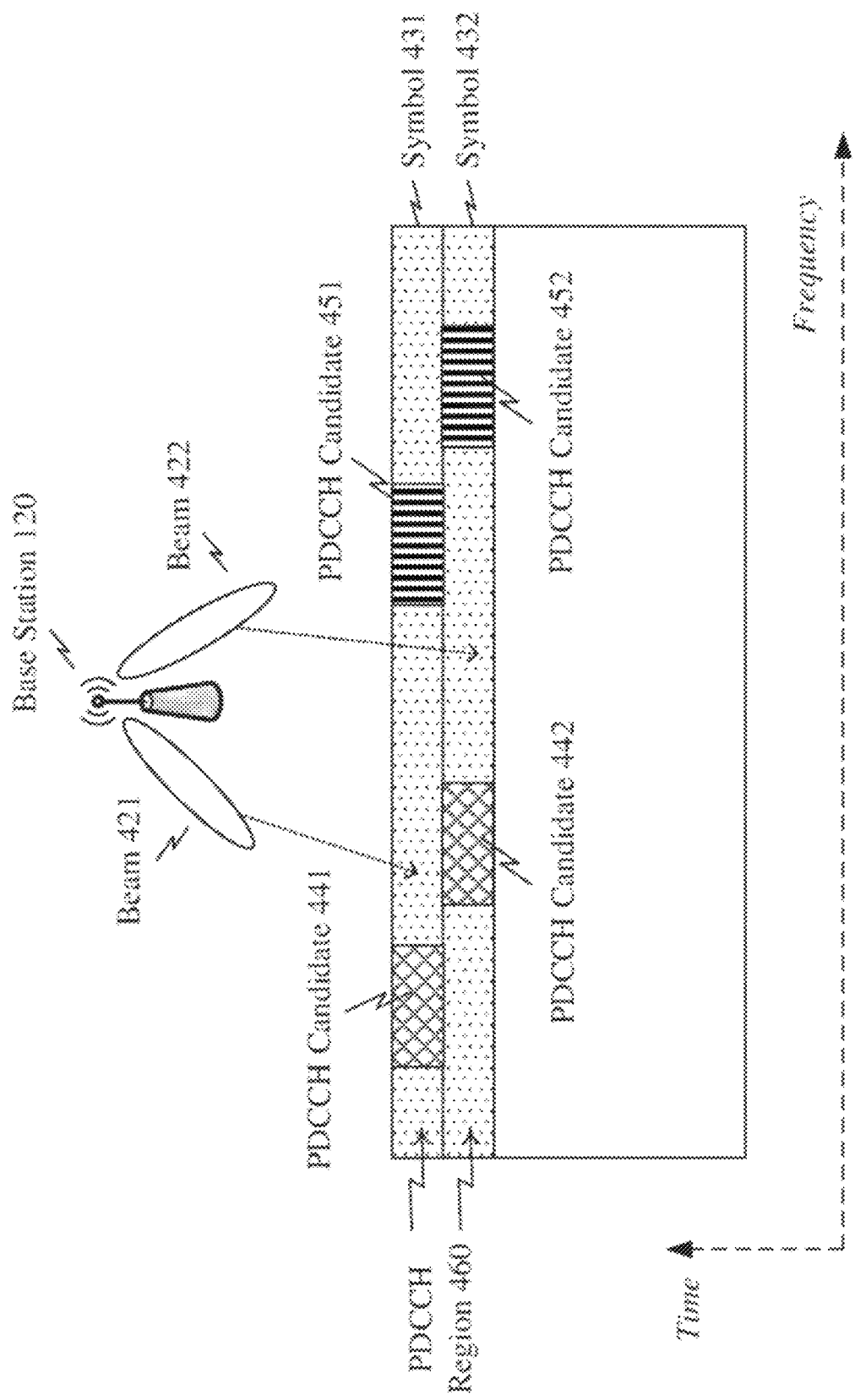
FIG. 4 is a schematic diagram of an exemplary control channel configuration in a wireless communication system, according to some embodiments of the present application.

FIG. 4 is a schematic diagram of an exemplary control channel configuration in a wireless communication system, according to some embodiments of the present application. Consistent with capabilities of the 5G radio, base station 120 can configure PDCCH candidates on different OFDM symbols in different beams for user devices 140 and/or 160. For example, as shown in FIG. 4, base station 120 can use two beams 421 and 422 in the wireless communication system to transmit PDCCH with each beam carrying a different symbol. For example, beam 421 carries a symbol 431, and beam 422 carries a symbol 432. Accordingly, base station 120 can configure a PDCCH Region 460 on symbol 431 with beam 421 and on symbol 432 with beam 422.

Base station 120 can also configure PDCCH candidates 441 and 442 for a PDCCH #1, and PDCCH candidates 451 and 452 for a PDCCH #2, respectively. As shown in FIG. 4, base station 120 can configure PDCCH candidates respectively on different symbols in different beams. In addition, base station 120 can configure a PDCCH candidate over different symbols.

For example, base station 120 can configure PDCCH candidates 441 and 442 for PDCCH #1 on symbols 431 and 432, respectively. In this example, base station 120 configures PDCCH candidate 441 only on one symbol, i.e., symbol 431, and PDCCH candidate 442 only on one symbol, i.e., symbol 432. Accordingly, base station 120 can transmit PDCCH #1 by the whole PDCCH candidate 441, including all of its CCEs, on symbol 431 in one beam 421. Alternatively, base station 120 can transmit PDCCH #1 by the whole PDCCH candidate 442, including all of its CCEs, on symbol 432 in another beam 422.

Alternatively, base station 120 can configure PDCCH candidates across symbols in the same beam, but not across symbols in different beams.

Figure 5:
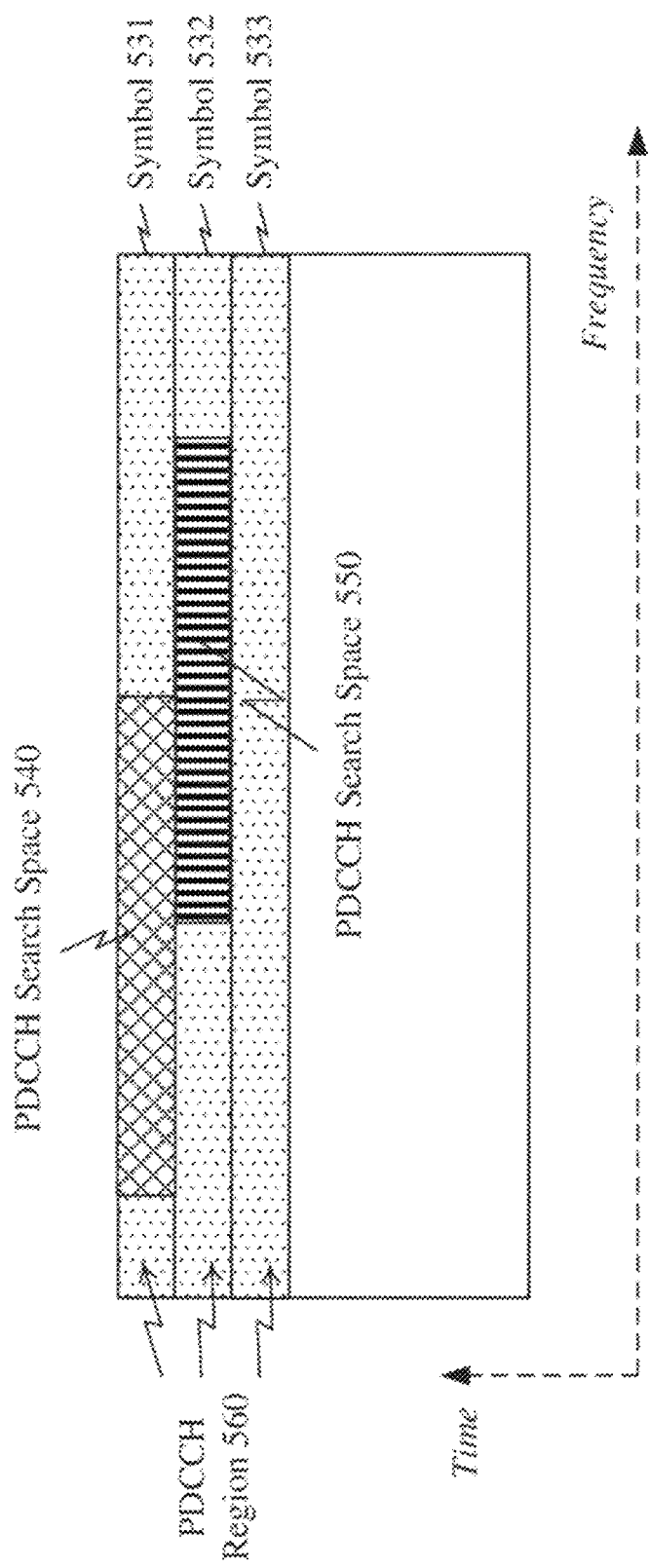
FIG. 5 is a schematic diagram of an exemplary control channel configuration in a wireless communication system, according to some embodiments of the present application.

FIG. 5 is a schematic diagram of an exemplary control channel configuration in a wireless communication system, according to some embodiments of the present application. From a user device's perspective, a search space may be configured on one symbol for the user device. Alternatively, multiple search spaces may be configured on multiple symbols for the user device, with each search space on one symbol. The base station can transmit one symbol in one beam. For example, as shown in FIG. 5, base station 120 can configure for user device 140 two PDCCH search spaces 540 and 550 on two symbols 531 and 532. PDCCH search space 540 is configured on symbol 531 and PDCCH search space 550 is configured on symbol 532. Thus, each search space for user device 140 is configured on one symbol. Symbol 531 may be transmitted in beam #1, and symbol 531 may be transmitted in beam #2.

As shown in FIG. 5, base station 120 can configure a control region, provided as a PDCCH region 560 that is over a full channel bandwidth on three symbols 531, 532, and 533. Two search spaces 540 and 550 are configured on the first two symbols 531 and 532 in PDCCH region 560. Base station 120 can configure PDCCH search space 540 spanning a partial or whole frequency portion of symbol 531 in PDCCH region 560 configured for user device 140. Base station 120 can also configure PDCCH search space 540 for user device 140 on some resource elements that are configured as part of a search space for another user device, e.g., user device 160.

A user device can search for its PDCCH candidates using different CCE ALs in its search spaces. For example, user device 140 can search for PDCCH candidates using CCE AL=1, 2, 8 in PDCCH search space 540. User device 140 can also search for PDCCH candidates using CCE AL=1 and 4 in PDCCH search 550.

Figure 6:
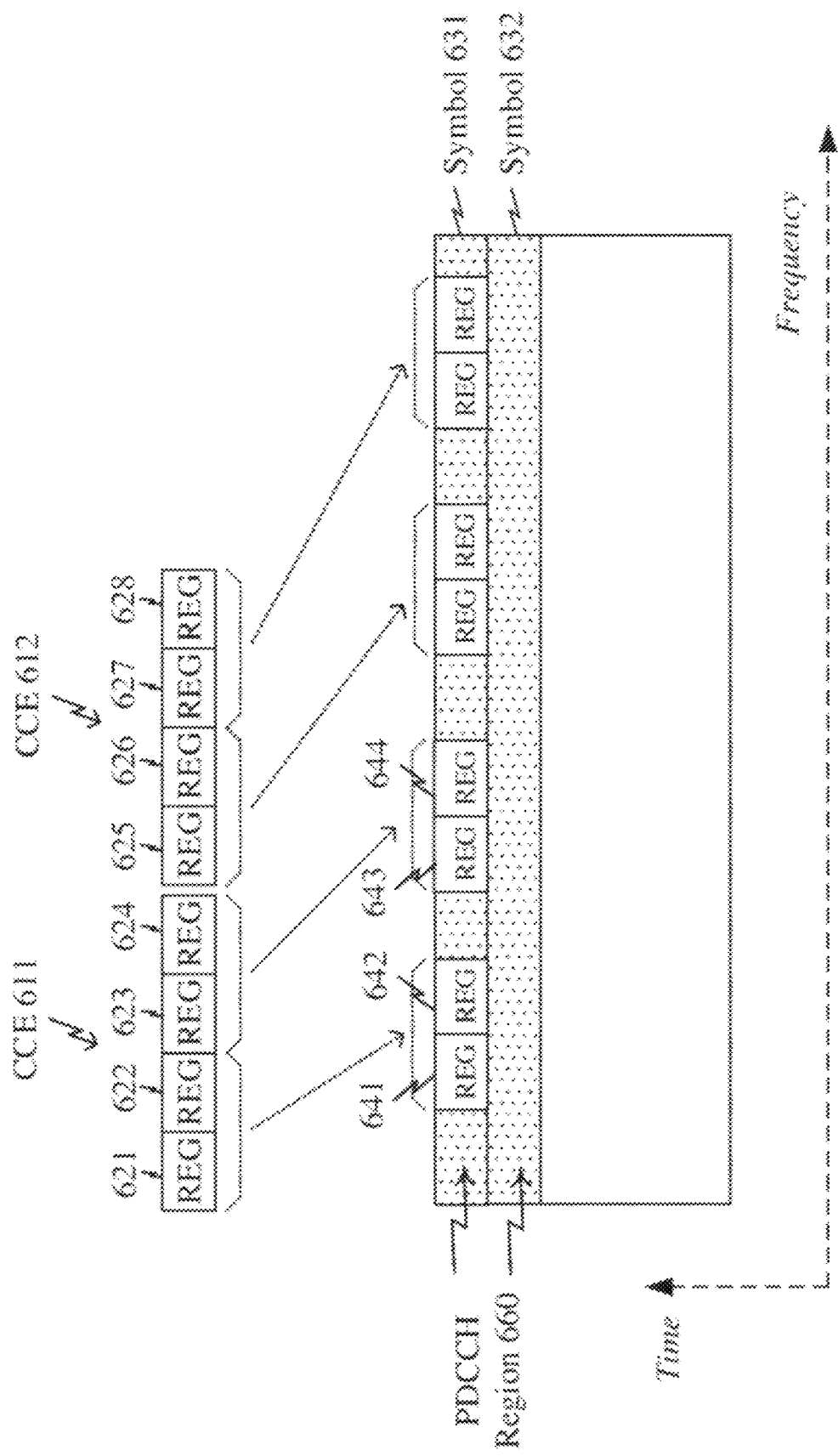
FIG. 6 is a schematic diagram of an exemplary control channel configuration with distributed mapping in a wireless communication system, according to some embodiments of the present application.

FIG. 6 is a schematic diagram of an exemplary control channel configuration with distributed mapping in a wireless communication system, according to some embodiments of the present application. In the 5G radio system, a PDCCH may include one or more CCEs, as shown in FIG. 3 and described above. Each CCE may further include a plurality of REGs. For example, as shown in FIG. 6, base station 120 can configure a CCE 611 including four REGs 621, 622, 623, and 624. Base station 120 can also configure a CCE 612 including another four REGs 625, 626, 627, and 628. A REG can include a physical resource block (PRB) on one OFDM symbol.

In a search space, base station 120 may configure CCE-to-REG and CCE to control channel (CCE-to-CCH) mapping in either a time-first manner or a frequency-first manner. If base station 120 configures only one OFDM symbol for a search space, base station 120 configures only frequency-first CCE-to-REG mapping with frequency-first CCE-to-PDCCH mapping. Base station 120 may not separately indicate the mapping manner to user devices 140 and 160.

Base station 120 may further configure REGs of CCEs to be mapped to physical REGs in a localized manner or a distributed manner. For example, as shown in FIG. 6, base station 120 configures the first two REGs 621 and 622 of CCE 611 to be mapped on two physical REGs 641 and 642, and the third and fourth REGs 623 and 624 to another two physical REGs 643 and 644. Physical REGs 641 and 642 may be separate from physical REGs 643 and 644, i.e., mapping in a distributed manner.

Alternatively base station 120 may configure to group a certain number of REGs that contains a certain number of demodulation reference signal (DMRS) for a certain level of channel estimation quality, and distribute each group of REGs on frequency to exploit frequency diversity gain. For example, as shown in FIG. 6, base station 120 configures each two REGs into a group containing a certain number of DMRS for channel estimation, and distributes a plurality of groups of two REGs on frequency to exploit frequency diversity gain.

Figure 7:
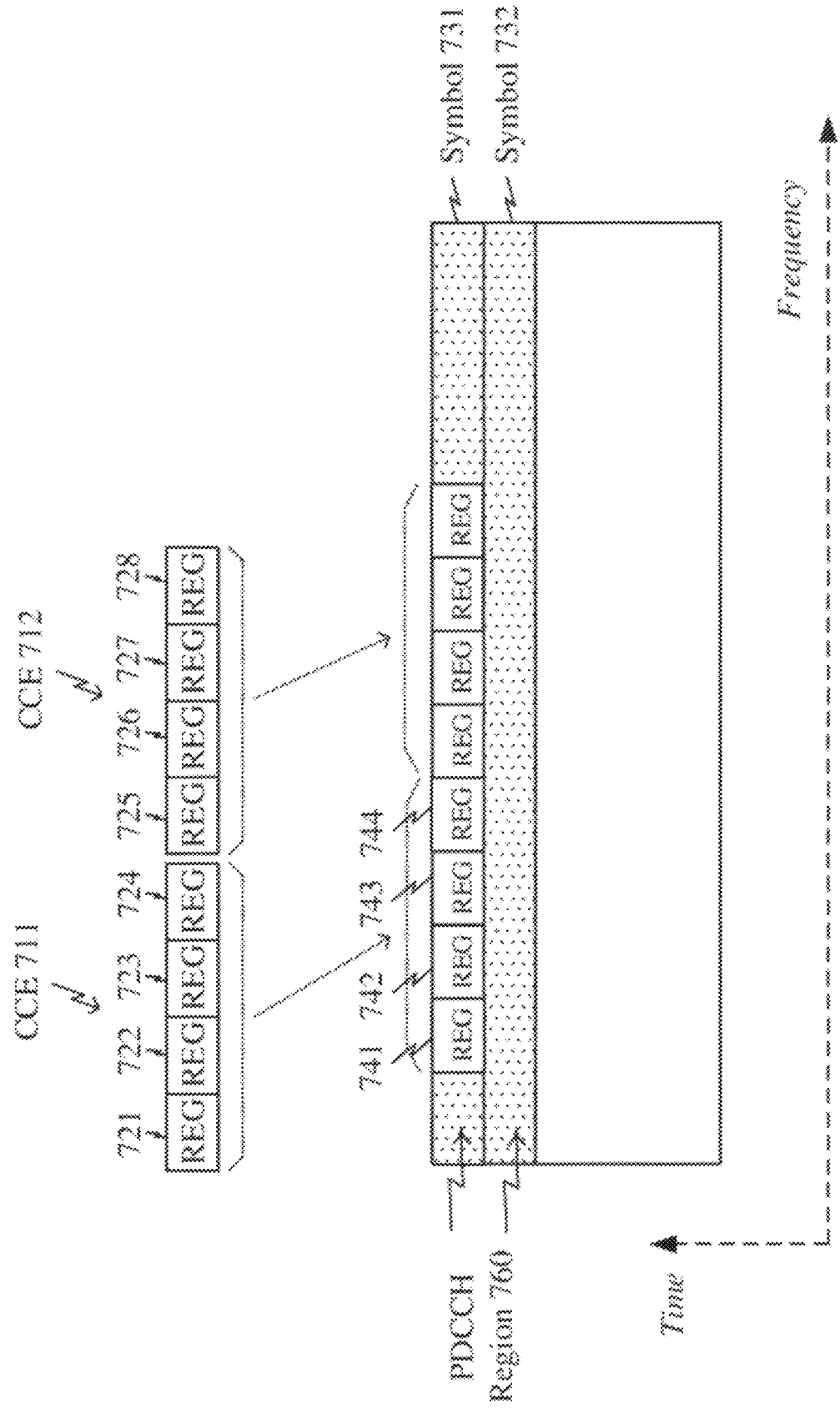
FIG. 7 is a schematic diagram of an exemplary control channel configuration with localized mapping in a wireless communication system, according to some embodiments of the present application.

FIG. 7 is a schematic diagram of an exemplary control channel configuration with localized mapping in a wireless communication system, according to some embodiments of the present application. In order to balance channel estimation performance and/or utilize frequency diversity, base station 120 may configure all REGs of one CCE to be mapped to physical REGs contiguously in frequency. For example, as shown in FIG. 7, base station 120 configures all REGs 721, 722, 723, and 724 of a CCE 711 to be mapped to contiguous physical REGs 741, 742, 743, and 744, i.e., mapping in a localized manner. In some embodiments, base station 120 also configures the four REGs of a CCE 712 to be mapped to four physical REGs that are contiguous to four physical REGs 741-744.

Alternatively, base station 120 may configure REGs of one or more CCEs to be mapped on frequency contiguously to exploit frequency selective or beamforming gain. In FIG. 7, for example, base station 120 configures eight REGs of two CCEs to be mapped on frequency contiguously to benefit from frequency selective or beamforming gain.

Figure 8:
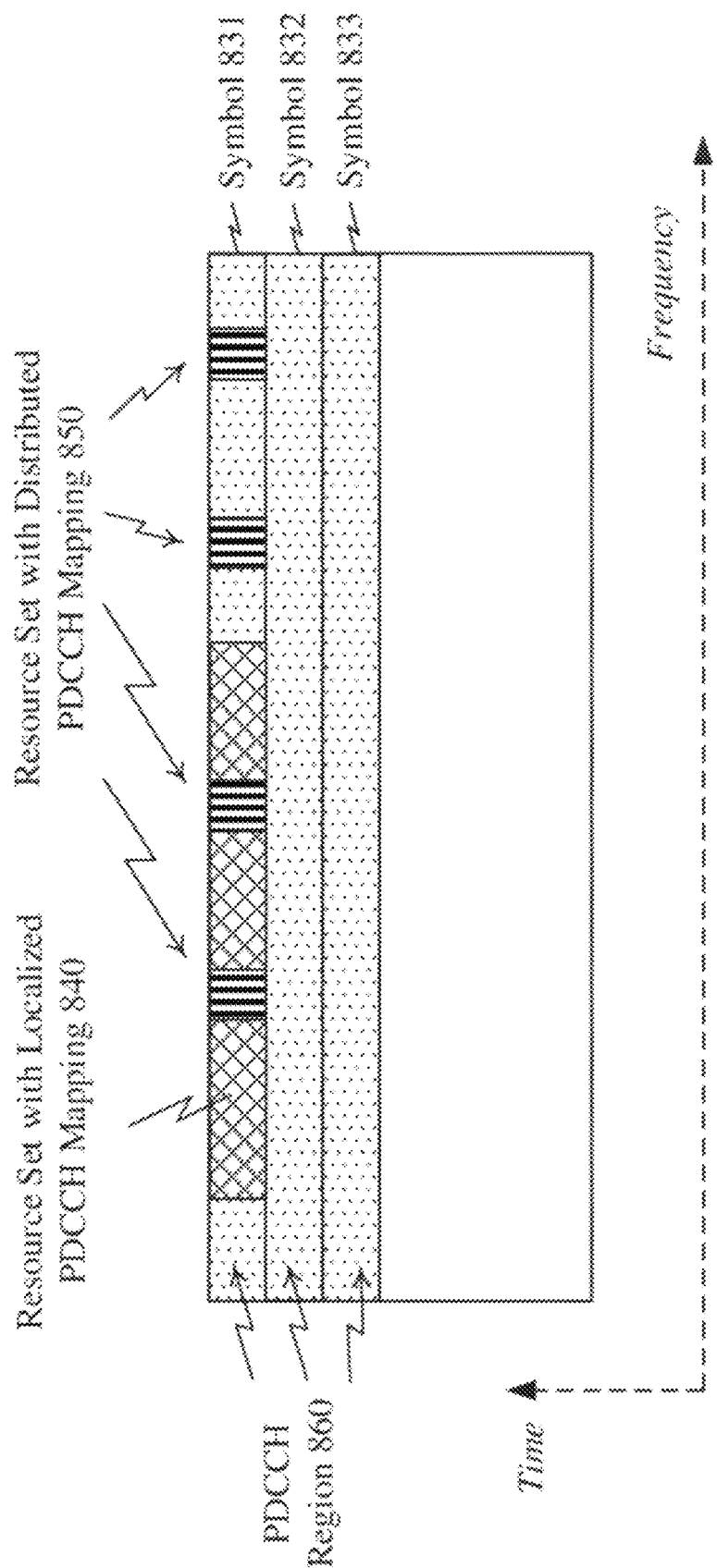
FIG. 8 is a schematic diagram of an exemplary control resource set configuration in a wireless communication system, according to some embodiments of the present application.

FIG. 8 is a schematic diagram of an exemplary control resource set configuration in a wireless communication system, according to some embodiments of the present application. Base station 120 may configure a search space with either a distributed mapping or a localized mapping, but not both. In addition, base station 120 may configure different search spaces with different mapping manners on one or more OFDM symbols. Furthermore, base station 120 can configure different user devices with the same set of control resources as their search spaces. Alternatively, base station 120 can configure different resource sets, with each resource set containing one or more search spaces of different user devices with localized or distributed mapping. In some embodiments, base station 120 configures control resource sets to be non-overlapping or overlapping in frequency.

For example, as shown in FIG. 8, base station 120 configures a resource set with localized PDCCH mapping 840 and a resource set with distributed PDCCH mapping 850 on symbol 831. As shown in FIG. 8, base station 120 can configure a part of resource set with distributed PDCCH mapping 850 to be overlapping with resource set with localized PDCCH mapping 840. Base station 120 can also configure a part of resource set with distributed PDCCH mapping 850 to be non-overlapping with resource set with localized PDCCH mapping 840.

Base station 120 can configure resource set with distributed PDCCH mapping 850 and resource set with localized PDCCH mapping 840, i.e., different resource sets with different PDCCH mapping, as resource sets that contain user-device-specific control channel search spaces, or that contain a group-common control channel search space. For example, base station 120 configures a resource set containing user-device-specific control channel search spaces with localized PDCCH mapping to overlap with a resource set containing user-device-specific control channel search spaces with distributed PDCCH mapping. Alternatively, base station 120 can configure a resource set containing user-device-specific control channel search spaces with localized PDCCH mapping to overlap with a resource set containing group-common control channel search spaces.

Figure 9:
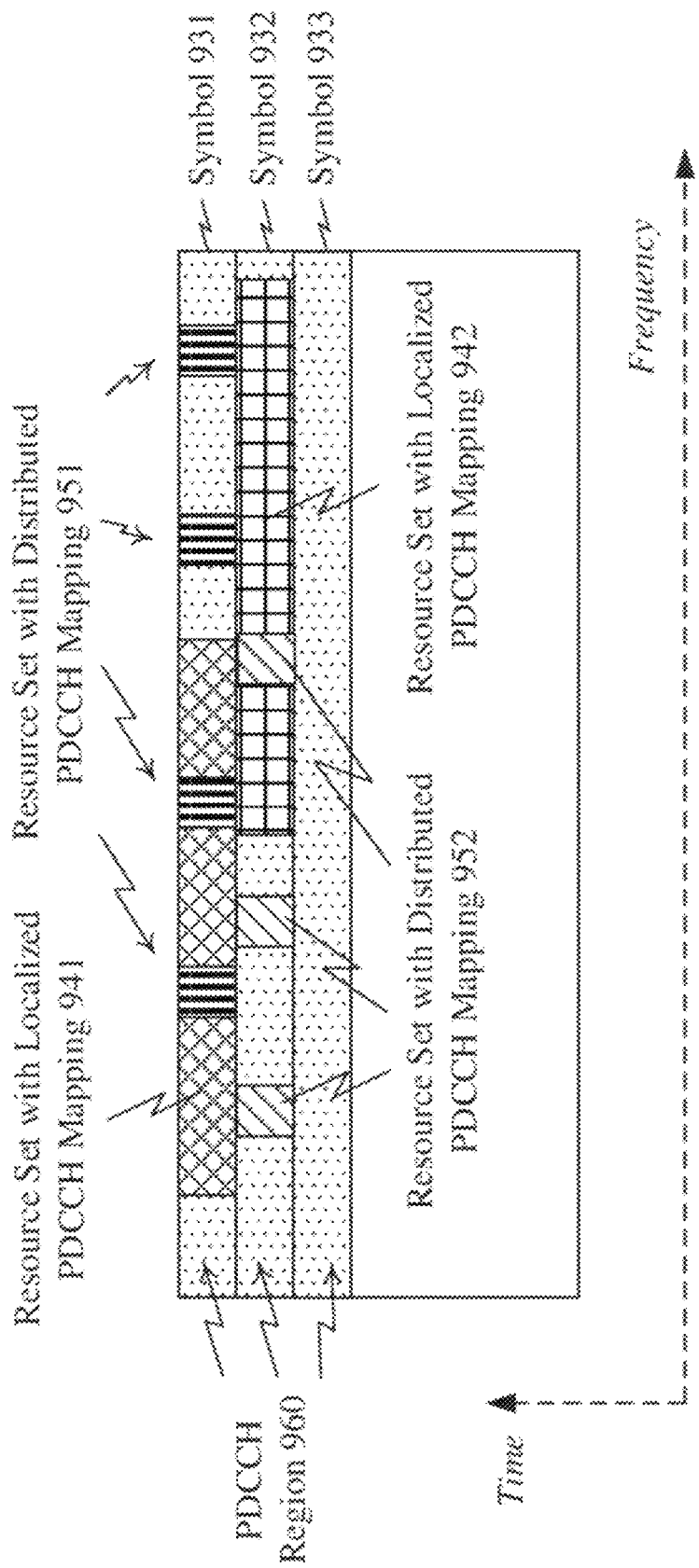
FIG. 9 is a schematic diagram of an exemplary control resource set configuration in a wireless communication system, according to some embodiments of the present application.

FIG. 9 is a schematic diagram of an exemplary control resource set configuration in a wireless communication system, according to some embodiments of the present application. In the 5G radio system, for example, base station 120 may configure resource sets with localized PDCCH mapping or distributed PDCCH mapping on the basis of one OFDM symbol or multiple OFDM symbols. For example, as shown in FIG. 9, base station 120 configures a resource set with localized PDCCH mapping 941 and a resource set with distributed PDCCH mapping 951 on a symbol 931. Base station 120 also configures a resource set with distributed PDCCH mapping 952 and a resource set with localized PDCCH mapping 942 on a symbol 932. On different OFDM symbols 931 and 932, base station 120 can schedule different configurations of resource sets for localized and distributed PDCCH mapping.

That is, base station 120 configures only one type of resource set on one or more OFDM symbols. Alternatively, base station 120 can also configure different, multiple types of resource sets on one or more OFDM symbols. For example, base station 120 may configure a group-common control channel or common control channel to be transmitted on the first OFDM symbol, and may use distributed PDCCH mapping to benefit from frequency diversity gain. Therefore, base station 120 configures, on the first OFDM symbol, two types of resource sets. One resource set with localized PDCCH mapping contains search spaces for user-device-specific control channels. The other resource set with distributed PDCCH mapping can contain search spaces for user-device-specific controls channel as well as the group-common control channel or common control channels.

In some embodiments, base station 120 may configure only resource sets for localized PDCCH mapping carrying search spaces for user-device-specific control channels. Alternatively, base station 120 may configure each OFDM symbol with only one type of resource set that either supports localized or distributed PDCCH mapping to reduce collisions among them.

Figure 10:
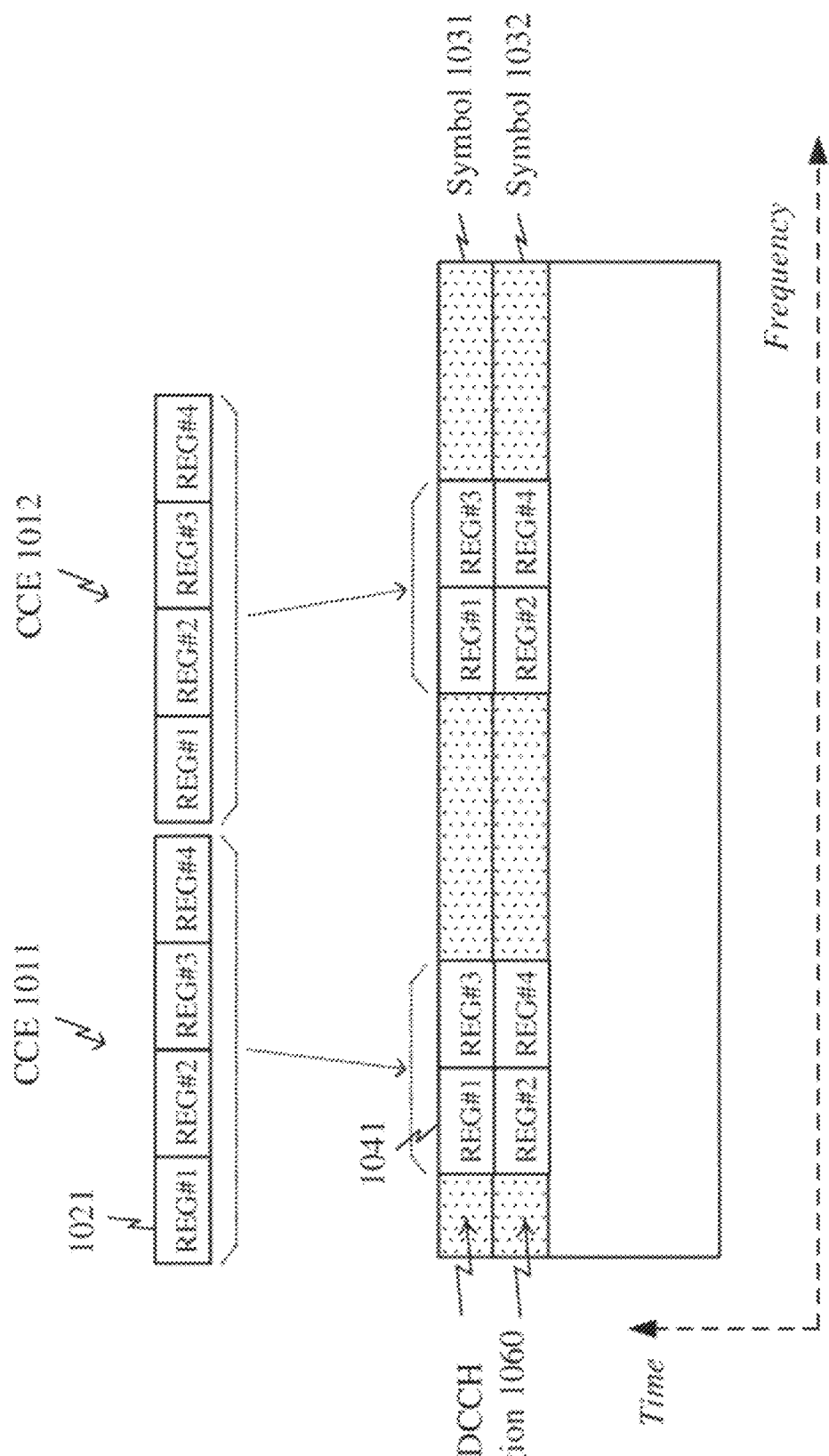
FIG. 10 is a schematic diagram of an exemplary CCE-to-REG and CCE-to-CCH mapping in a wireless communication system, according to some embodiments of the present application.

FIG. 10 is a schematic diagram of an exemplary CCE-to-REG and CCE-to-CCH mapping in a wireless communication system, according to some embodiments of the present application. In the 5G radio system, for example, base station 120 may configure a time-first of CCE-to-REG with a frequency-first CCE-to-CCH mapping (referred to as "T+F mapping") for PDCCH. That is, base station 120 maps REGs of each CCE to physical REGs sequentially in the time domain first, and then maps REGs of multiple CCEs to physical REGs in the frequency domain.

For example, as shown in FIG. 10, base station 120 configures CCEs 1011 and 1012 each including their REGs #1, #2, #3, and #4. Base station 120 configures mapping of the first two REGs of CCE 1011 to physical REGs on OFDM symbols 1031 and 1032 first, and then mapping of the third and fourth REGs of CCE 1011 to physical REGs on OFDM symbol 1031 and 1032. Similarly, as shown in FIG. 10, base station 120 configures mapping of the four REGs of CCE 1012 to physical REGs by the time-first CCE-to-REG mapping. Then, base station 120 configures four REGs of CCE 1011 and four REGs of CCE 1012 to be mapped to respective four physical REGs in the frequency domain first, i.e., the frequency-first CCE-to-CCH mapping. In some embodiments, base station 120 can configure the four REGs of CCE 1011 and the four REGs of CCE 1012 to be mapped to four separate physical REGs, i.e., distributed mapping, similar to that illustrated in FIG. 6.

To maintain channel estimation performance, base station 120 may map two REGs to two contiguous PRBs in frequency, and thus DMRS in the contiguous two PRBs could be used jointly for channel estimation. If channel variation is small over time, the REGs in a first OFDM symbol (e.g., symbol 1031) may contain DMRS while the REGs in a subsequent OFDM symbol (e.g., symbol 1032) may not contain DMRS. Base station 120 may map using the four REGs of one CCE as a unit in distributed frequency, i.e., the distributed mapping shown in FIG. 10. Alternatively, base station 120 can map using the four REGs of one CCE as a unit in contiguous frequency, i.e., the localized mapping shown in FIG. 11, as described below.

Figure 11:
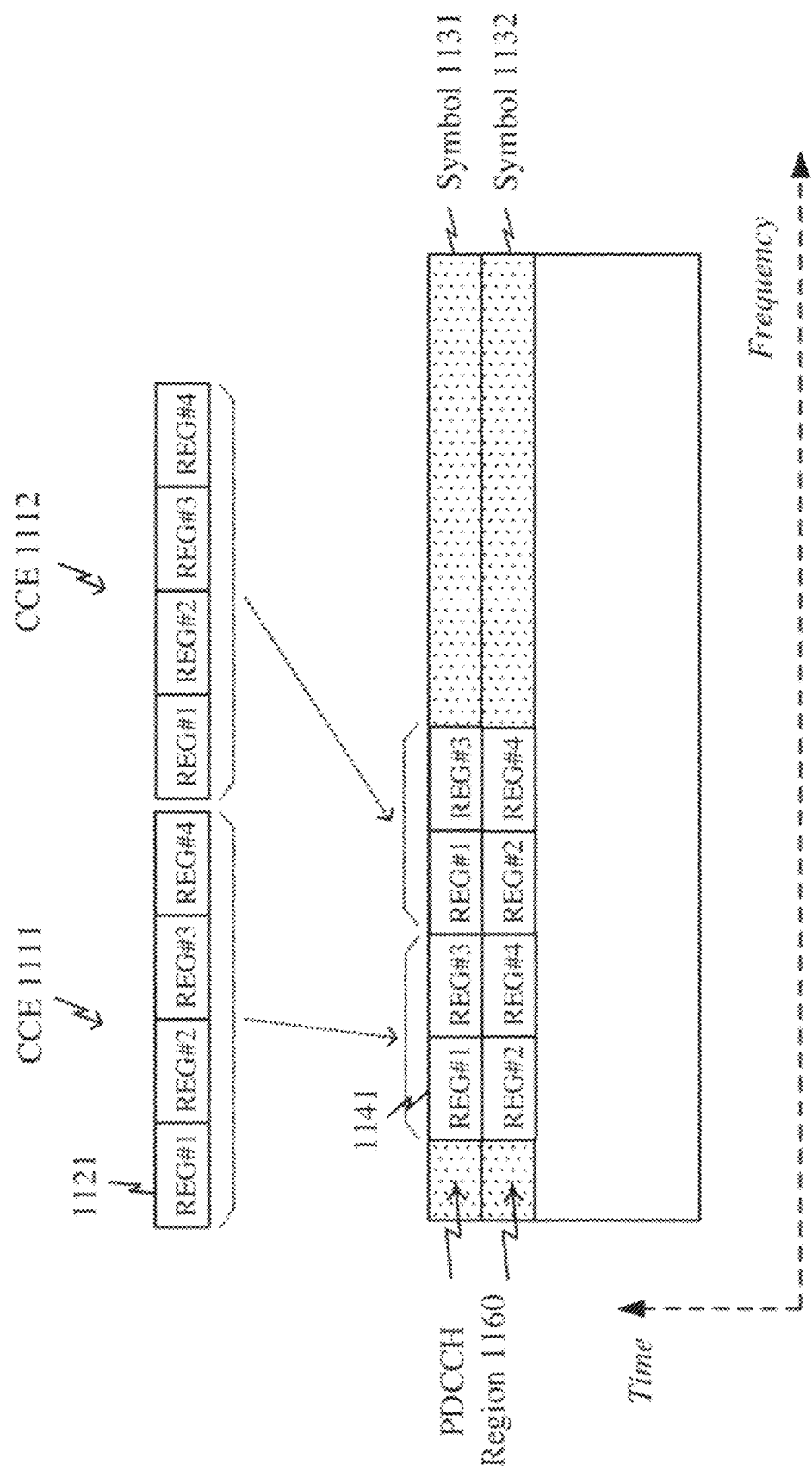
FIG. 11 is a schematic diagram of an exemplary CCE-to-REG and CCE-to-CCH mapping in a wireless communication system, according to some embodiments of the present application.

FIG. 11 is a schematic diagram of an exemplary CCE-to-REG and CCE-to-CCH mapping in a wireless communication system, according to some embodiments of the present application. As shown in FIG. 11, base station 120 configures the four physical REGs mapped from a CCE 1111 and the four physical REGs mapped from a CCE 1112 to be contiguous in frequency on two symbols 1131 and 1132, i.e., localized mapping, similar to that illustrated in FIG. 6. The localized mapping may benefit from frequency selective and beamforming gain while the distributed mapping may benefit from frequency diversity gain.

In some embodiments, base station 120 configures even numbers of REGs in a CCE (e.g., 2, 4, 6, 8, or more) to facilitate CCE-to-REG mapping in a uniformed manner and/or avoid fragmented REGs that may be wasted. For example, base station 120 may configure a CCE including 4 REGs. When base station 120 configures two OFDM symbols for a CORESET, base station 120 maps REGs of each CCE to a two-PRBs-by-two-symbol resource block.

Figure 12:
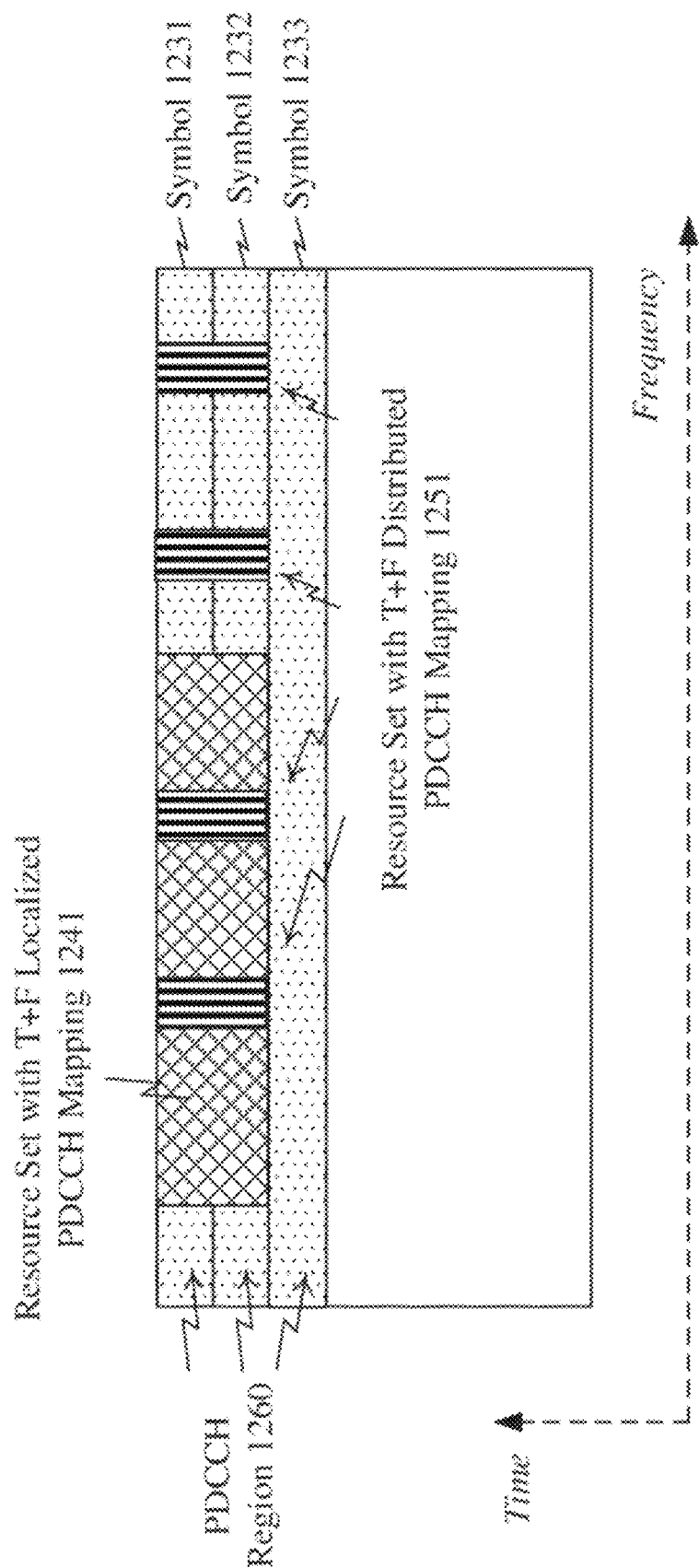
FIG. 12 is a schematic diagram of an exemplary control resource set configuration in a wireless communication system, according to some embodiments of the present application.

FIG. 12 is a schematic diagram of an exemplary control resource set configuration in a wireless communication system, according to some embodiments of the present application. Base station 120 may configure different control resource sets with either localized or distributed PDCCH mapping. Base station 120 can configure these control resource sets to be non-overlapping or overlapped. For example, as shown in FIG. 12, base station 120 configures a resource set with time-first CCE-to-REG mapping, frequency-first CCE-to-CCH mapping, and localized mapping 1241 (i.e., resource set with T+F localized PDCCH mapping 1241). Base station 120 can also configure a resource set with time-first CCE-to-REG mapping, frequency-first CCE-to-CCH mapping, and distributed mapping 1251 (i.e., resource set with T+F distributed PDCCH mapping 1251). In some embodiments, base station 120 can configure these two resource sets overlapped, partly overlapped, or non-overlapping. For example, as shown in FIG. 12, base station 120 configures resource sets 1241 and 1251 to be partly overlapped.

Figure 13:
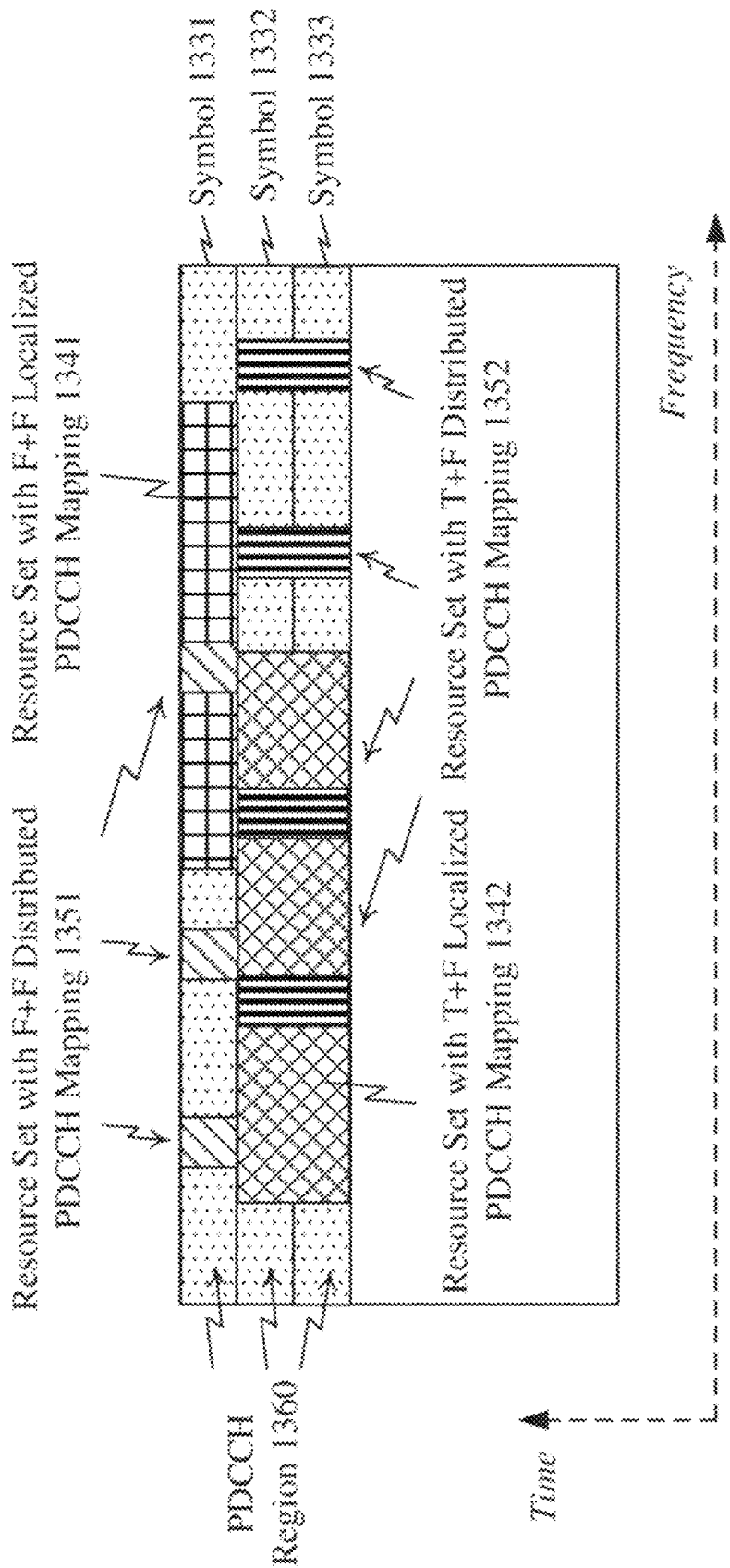
FIG. 13 is a schematic diagram of an exemplary control resource set configuration in a wireless communication system, according to some embodiments of the present application.

FIG. 13 is a schematic diagram of an exemplary control resource set configuration in a wireless communication system, according to some embodiments of the present application.

Base station 120 may configure resource sets with two types of mapping, including time-first CCE-to-REG plus frequency-first CCE-to-CCH mapping (i.e., T+F mapping denoted in FIGS. 12 and 13) and frequency-first CCE-to-REG plus frequency-first CCE-to-CCH mapping (i.e., F+F mapping denoted in FIGS. 12 and 13) on different OFDM symbols. As shown in FIG. 13, for example, base station 120 configures a resource set with F+F localized PDCCH mapping 1341 on a symbol 1331, a resource set with T+F localized PDCCH mapping 1342 on symbols 1332 and 1333, a resource set with F+F distributed PDCCH mapping 1351 on symbol 1331, and a resource set with T+F distributed PDCCH 1352 on symbols 1332 and 1333. Base station 120 can configure resource set with F+F distributed PDCCH mapping 1351 to be overlapped, partly overlapped, or non-overlapping with resource set with F+F localized PDCCH mapping 1341 on symbol 1331.

As shown in FIG. 13, base station 120 configures a part of resource set with F+F distributed PDCCH mapping 1351 to be overlapped with resource set with F+F localized PDCCH mapping 1341 on symbol 1331, and another part of resource set with F+F distributed PDCCH mapping 1351 to be non-overlapping with resource set with F+F localized PDCCH mapping 1341 on symbol 1331. Base station 120 can also configure resource set with T+F localized PDCCH mapping 1342 to be partly overlapped with resource set with T+F distributed PDCCH 1352 on symbols 1332 and 1333.

Figure 14:
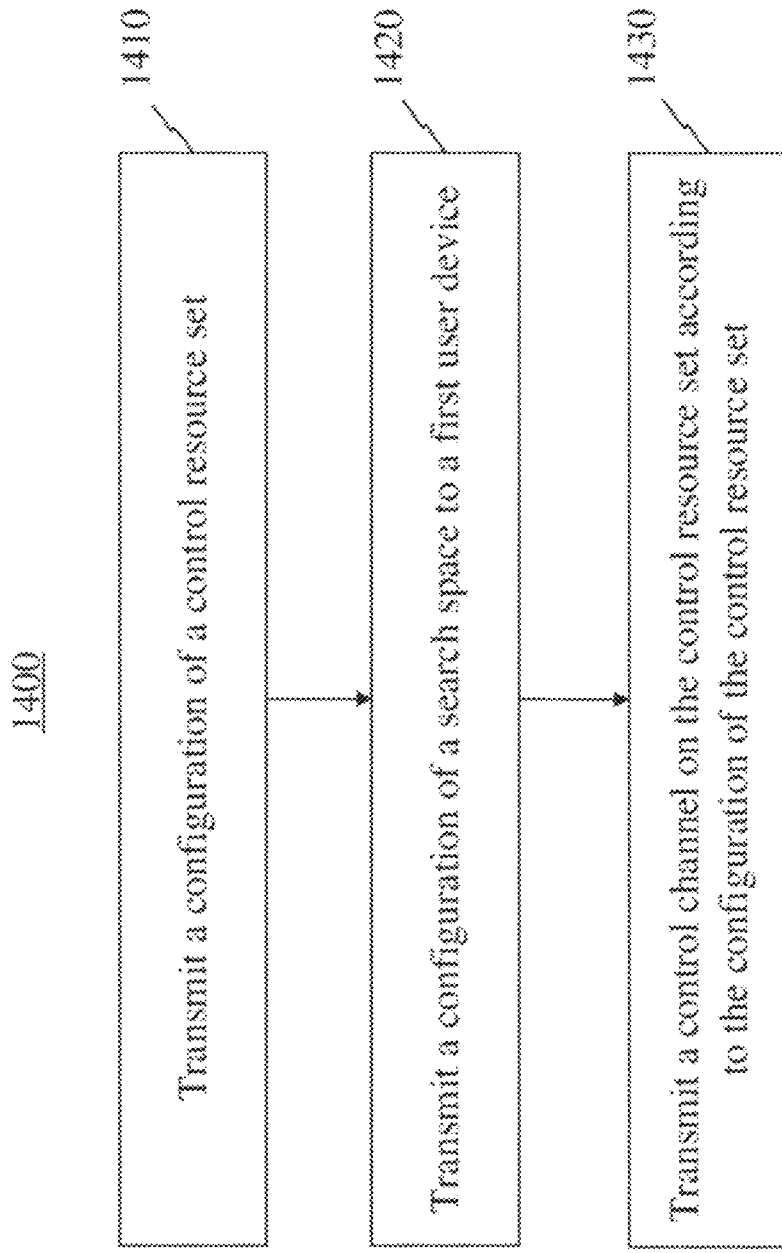
FIG. 14 is a schematic diagram of an exemplary method for control resource configuration in a wireless communication system, according to some embodiments of the present application.

FIG. 14 is a flow diagram of an exemplary method 1400 for control resource configuration in a wireless communication system, according to some embodiments of the present application. Method 1400 may be practiced by base station 120. Method 1400 includes transmitting a configuration of a first control resource set (step 1410), transmitting a configuration of a search space to a first user device (step 1420), and transmitting a control channel on the control resource set according to the configuration of the control resource set (step 1430).

Step 1410 includes transmitting a configuration of a control resource set. For example, as shown in FIG. 1, base station 120 transmits a configuration of a control resource set to user device 140. Base station 120 can configure the control resource set in a control region including time and frequency resources. For example, as shown in FIG. 4, base station 120 configures PDCCH candidates 441 and 442 for PDCCH transmission in PDCCH region 460 that is over the full bandwidth on symbols 431 and 432.

Step 1420 includes transmitting a configuration of a search space to a user device. For example, as shown in FIG. 5, base station 120 transmits the configuration of two PDCCH search spaces 540 and 550 on two symbols 531 and 532 to user device 140. The configuration indicates that PDCCH search space 540 is configured on symbol 531, and that PDCCH search space 550 is configured on symbol 532. The configuration may also indicates that symbol 531 is transmitted in beam #1, and symbol 531 is transmitted in beam #2.

Step 1430 includes transmitting a control channel on the control resource set according to the configuration of the control resource set. For example, after base station 120 configures a control resource set as described above with reference to FIGS. 4-13, base station 120 can transmit a PDCCH according to the configuration of the control resource set. User device 140 can detect and receive its PDCCH according to the received configuration of the control resource set from base station 120.

In some embodiments, step 1410 may include transmitting the configuration of a control resource set that includes an indication of a starting symbol of a search space in the control resource set. For example, as shown in FIG. 4, base station 120 can transmit the configuration of the control resource set of PDCCH candidates 441 and 442 with an indication that symbol 431 is the starting symbol of the search space in the control resource set.

In some embodiments, step 1410 can include transmitting the configuration of a control resource set that includes an indication of CCE to CCH mapping. For example, as shown in FIG. 10, base station 120 can transmit the configuration of the control resource set that includes an indication that four REGs of CCE 1011 and four REGs of CCE 1012 are mapped to respective four physical REGs in the frequency domain first, i.e., the frequency-first CCE-to-CCH mapping. In another aspect, base station 120 can transmit the configuration of the control resource set that includes an indication that two CCEs are mapped to respective physical REGs in the time domain first, i.e., the time-first CCE-to-CCH mapping.

In some embodiments, step 1410 may include transmitting the configuration of a control resource set that includes an indication of CCE-to-REG mapping. For example, as shown in FIG. 10, base station 120 can transmit the configuration of the control resource set that includes an indication that the four REGs of CCE 1012 are mapped to physical REGs by the time-first CCE-to-REG mapping. In another aspect, base station 120 can transmit the configuration of the control resource set that includes an indication that a plurality of REGs of a CCE are mapped to physical REGs by the frequency-first CCE-to-REG mapping.

In some embodiments, step 1410 can include transmit the configuration of a control resource set that includes an indication of REG/CCE mapping to physical resource elements. For example, as shown in FIG. 10, base station 120 can transmit the configuration of the control resource set that includes an indication that the four REGs of CCE 1011 and the four REGs of CCE 1012 are separately mapped to respective four physical REGs, i.e., a distributed REG/CCE to physical resource elements mapping. As another example, as shown in FIG. 11, base station 120 transmits the configuration of the control resource set that includes an indication that the four REGs of CCE 1111 and the four REGs of CCE 1112 are continuously mapped to respective four physical REGs, i.e., a localized REG/CCE to physical resource elements mapping.

Alternatively, step 1410 may include transmitting the configuration of a control resource set that includes an indication of a transmit diversity scheme. For example, base station 120 can transmit the configuration of the control resource set that includes an indication that the transmit diversity scheme is a space frequency block code (SFBC). Accordingly, base station 120 transmits PDCCH to user device 140 using the SFBC transmit diversity scheme.

In some embodiments, step 1410 may include transmitting the configuration of the control resource set that includes an indication of reference signal allocation. For example, base station 120 can transmit the configuration of the control resource set that includes an indication that periodic channel status information reference signals (CSI-RS) are allocated, and that a tenth antenna port is used to transmit the CSI-RS. The antenna port of the CSI-RS is associated with a pattern of CSI-RS signals on frequency and time domains.

In some embodiments, step 1410 can also include transmitting the configuration of a control resource set that includes an indication of physical resource block (PRB) bundling. For example, as shown in FIG. 6, base station 120 can transmit the configuration of the control resource set with an indication indicates that two REGs 641 and 642 are bundled. Accordingly, base station 120 indicates a size of PRB bundling equal to two REGs. When user device 140 receives this indication from the configuration of the control resource set, user device 140 can detect PDCCH on the two bundled REGs 641 and 642. As another example shown in FIG. 10, base station 120 can transmit the configuration of the control resource set with an indication that four REGs are bundled across time and frequency domains. User device 140 can detect PDCCH on the four bundled REGs accordingly after receiving the configuration of the control resource set.

Alternatively, step 1410 may include transmitting the configuration of a control resource set that includes an indication of a number of symbols. For example, as shown in FIG. 4, base station 120 transmits the configuration of the control resource set that includes an indication that two symbols 431 and 432 are included in the control resource set. As another example in FIG. 5, base station 120 transmits the configuration of the control resource set that includes an indication that three symbols 531, 532, and 533 are included in the control resource set.

In some embodiments, step 1410 may include transmitting the configuration of a control resource set that includes an indication of physical resource blocks (PRBs). For example, as shown in FIG. 11, base station 120 transmits the configuration of the control resource set that includes an indication that eight PRBs are used for transmission of the control resource set.

Step 1410 may also include transmitting the configuration of the control resource set that includes an indication of a starting PRB. For example, as shown in FIG. 11, base station 120 can transmit the configuration of the control resource set that includes an indication the second PRB on symbol 1131 is the starting PRB. User device 140 can detect PDCCH accordingly after receiving the configuration of the control resource set including the indication of the starting PRB.

In some embodiments, step 1410 can include transmitting two configurations of a first control resource set and a second control resource set. The configuration of the second control resource set can include one or more of the above described indications included in the configuration of the first control resource set. When base station 120 transmits the configurations of the first and second control resource sets, step 1430 of method 1400 can include transmitting one or more control channels according to the configuration of the first control resource set, the configuration of the second resource set, or both of the configurations of the first and second control resource sets. For example, as shown in FIG. 4, base station 120 transmits another configuration of the control resource set of PDCCH candidates 451 and 452 while it transmits the configuration of the control resource set of PDCCH candidates 441 and 442. In step 1430, base station 120 can transmit one or more PDCCHs in either one or both of the control resource set of PDCCH candidates 441 and 442 and the control resource set of PDCCH candidates 451 and 452 according to the configurations of the first and second control resource sets.

In some embodiments, step 1410 may include transmitting the configuration of the first control resource set and the configuration of the second control resource set that include at least one common indication including the indication of CCE-to-CCH mapping, the indication of CCE-to-REG mapping, the indication of REG/CCE mapping to physical resource elements, the indication of a transmit diversity scheme, the indication of reference signal allocation, the indication of PRB bundling, the indication of the number of symbols, the indication of the starting symbol of the search space in the first control resource set, the indication of the number of PRBs, or the indication of a starting PRB.

For example, as shown in FIG. 4, base station 120 can transmit the configuration of the control resource set of PDCCH candidates 441 and 442 and the configuration of the control resource set of PDCCH candidates 451 and 452 that include at least one common indication including the indication of frequency-first CCE-to-CCH mapping, the indication of frequency-first CCE-to-REG mapping, the indication of localized REG/CCE mapping to physical resource elements, the indication of PRB bundling of 2 RGEs, the indication of the number of symbols, the indication of the starting symbol of the search space in the control resource set, or the indication of the number of PRBs.

In some embodiments, step 1410 can include transmitting the configuration of the first control resource set and the configuration of the second control resource set that are on different symbols. For example, as shown in FIG. 5, base station 120 transmits two configuration of PDCCH search spaces 540 and 550 on symbol 531 and 532, respectively.

Alternatively, step 1410 may include transmitting the configuration of the first control resource set and the configuration of the second control resource set that are on at least one common symbol. For example, as shown in FIG. 4, base station 120 transmits the configuration of the control resource set of PDCCH candidates 441 and 442 and the configuration of the second control resource set of PDCCH candidates 451 and 452 on two common symbols 431 and 432.

In some embodiments, step 1410 may include transmitting the configuration of the first control resource set and the configuration of the second control resource set that are overlapped in frequency. For example, as shown in FIG. 8, base station 120 transmits the configurations of resource set with localized PDCCH mapping 840 and resource set with distributed PDCCH mapping 850 that are overlapped in frequency.

Alternatively, step 1410 can include transmitting the configuration of the first control resource set and the configuration of the second control resource set that are non-overlapped in frequency. For example, as shown in FIG. 4, base station 120 transmits the configuration of the control resource set of PDCCH candidates 441 and 442 and the configuration of the control resource set of PDCCH candidates 451 and 452 that are non-overlapped in frequency.

In some embodiments, step 1410 may include transmitting the configurations of the first control resource set and the second control resource set that both include the indications of CCE to REG mapping being the frequency-first mapping and the indications of CCE to CCH mapping being the frequency-first mapping. In addition, the first control resource set and the second control resource set are configured on the same set of symbols. For example, as shown in FIG. 13, base station 120 transmits the configurations of resource set with F+F distributed PDCCH mapping 1351 and resource set with F+F localized PDCCH mapping 1341 that both include the indications of CCE to REG mapping being the frequency-first mapping and the indications of CCE to CCH mapping being the frequency-first mapping. In addition, resource set with F+F distributed PDCCH mapping 1351 and resource set with F+F localized PDCCH mapping 1341 are configured on the same symbol 1331.

In some embodiments, step 1410 may include transmitting the configurations of the first control resource set and the second control resource set that both include the indications of CCE to REG mapping being the time-first mapping and the indications of CCE to CCH mapping being the frequency-first mapping. In addition, the first control resource set and the second control resource set are configured on the same set of symbols. For example, as shown in FIG. 13, base station 120 transmits the configurations of resource set with T+F localized PDCCH mapping 1342 and resource set with T+F distributed PDCCH mapping 1352 that both include the indications of CCE to REG mapping being the time-first mapping and the indications of CCE to CCH mapping being the frequency-first mapping. In addition, resource set with T+F localized PDCCH mapping 1342 and resource set with T+F distributed PDCCH mapping 1352 are configured on the same set of symbols 1332 and 1333.

In some embodiments, step 1410 may include transmitting the configuration of the first control resource set includes the indication of CCE to REG mapping being the frequency-first mapping and the indication of CCE to CCH mapping being the frequency-first mapping. Base station 120 also transmits the configuration of the second control resource set including: the indication of CCE to REG mapping being the time-first mapping and the indication of CCE to CCH mapping being the frequency-first mapping. In addition, the first control resource set and the second control resource set are configured on different sets of symbols. For example, as shown in FIG. 13, base station 120 transmits the configurations of resource set with F+F distributed PDCCH mapping 1351 and resource set with T+F distributed PDCCH mapping 1352 that both include the indications of CCE to CCH mapping being the frequency-first mapping. The configuration of resource set with F+F distributed PDCCH mapping 1351 includes the indication of CCE to REG mapping being the time-first mapping. Resource set with T+F distributed PDCCH mapping 1352 includes the indication of CCE to REG mapping being the frequency-first mapping. In addition, resource set with F+F distributed PDCCH mapping 1351 and resource set with T+F distributed PDCCH mapping 1352 are respectively configured on a set of symbol 1331 and another set of symbols 1332 and 1333.

In some embodiments, step 1420 may include transmitting a configuration of a first search space to a first user device and transmitting a configuration of a second search space to a second user device. The first search space and the second search space are on a control resource set. The first search space and the second search space include a common CCE to CCH mapping, a common CCE to REG mapping, or a common REG/CCE mapping. For example, base station 120 transmits a configuration of a first search space on resource set with localized PDCCH mapping 840 of FIG. 8 to user device 140 and transmit a configuration of a second search space on the same resource set to user device 160. The first search space for user device 140 includes PDCCH candidate of CCE AL=1 and 2 on resource set with localized PDCCH mapping 840. The second search space for user device 160 includes PDCCH candidate of CCE AL=4 and 8 on resource set with localized PDCCH mapping 840. The first search space and the second search space on resource set with localized PDCCH mapping 840 include a common CCE to CCH mapping, a common CCE to REG mapping, or a common REG/CCE mapping, as described above for resource set with localized PDCCH mapping 840.

In some embodiments, step 1420 may include transmitting a configuration of a first search space and a configuration of a second search space to a user device. The first search space and the second search space are on different control resource sets. The first search space and the second search space are on the same one or more symbols. For example, base station 120 can transmit a configuration of search space #1 on resource set with T+F localized PDCCH mapping 1241 of FIG. 12 and another configuration of search space #2 on resource set with T+F distributed PDCCH mapping 1251 of FIG. 12 to user device 140. Search spaces #1 and #2 are on different control resource sets, but are on the same symbols 1231 and 1232.

In some embodiments, step 1420 may include transmitting a configuration of a first search space and a configuration of a second search space to a user device. The first search space and the second search space are on different control resource sets. The first search space and the second search space are on one or more different symbols. For example, base station 120 can transmit a configuration of the first search space on resource set with F+F distributed PDCCH mapping 1351 of FIG. 13 and another configuration of the second search space on resource set with T+F distributed PDCCH mapping 1351 of FIG. 13 to user device 140. The first and second search spaces are on different control resource sets, and are respectively on symbol 1331 and symbols 1332 and 1333.

Figure 15:
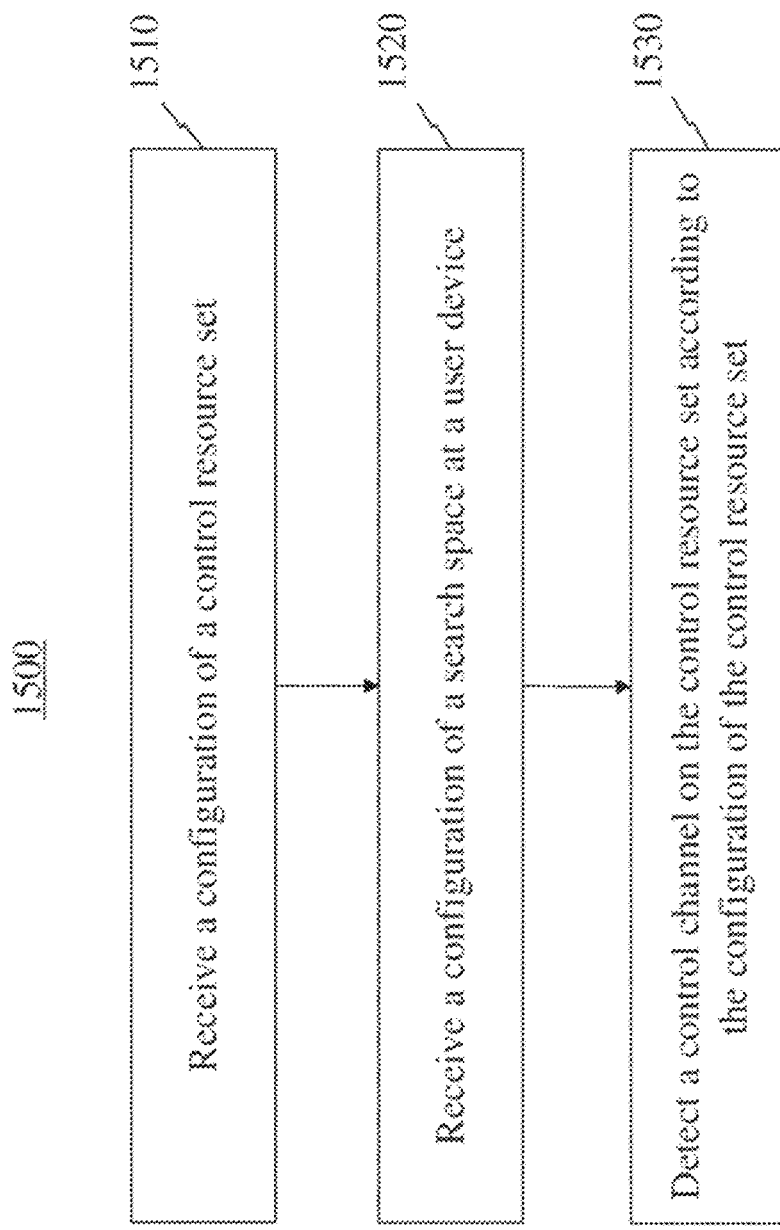
FIG. 15 is a schematic diagram of an exemplary method for detecting a control channel in a wireless communication system, according to some embodiments of the present application.

FIG. 15 is a flow diagram of an exemplary method 1500 for detecting a control channel in a wireless communication system, according to some embodiments of the present application. Method 1500 may be practiced by user device 140 or 160. Method 1500 includes receiving a configuration of a control resource set (step 1510), receiving a configuration of a search space at a user device (step 1520), and detecting a control channel on the control resource set according to the configuration of the control resource set (step 1530).

Step 1510 includes receiving a configuration of a control resource set. For example, as shown in FIG. 4, user device 140 receives the configuration of the control resource set of PDCCH candidates 441 and 442 for PDCCH transmission in PDCCH region 460 from base station 120. User device 140 can determine one or more indications from the configuration, including the indication of a starting symbol of the search space in the control resource set of PDCCH candidates 441 and 442, the indication of CCE to CCH mapping, the indication of CCE to REG mapping, the indication of REG/CCE mapping to physical resource elements, the indication of the transmit diversity scheme used by base station 120, the indication of reference signal allocation, the indication of PRB bundling, the indication of a number of symbols, an indication of physical resource blocks (PRBs), and an indication of a starting PRB.

As noted above, base station 120 may transmit the configuration of the control resource set as described above with reference to FIGS. 2-13 and illustrated in their descriptions. User device 140 can detect and receive its PDCCHs in accordance with the configuration of the control resource set from base station 120.

Step 1520 includes receiving a configuration of a search space at a user device. For example, as shown in FIG. 5, user device 140 receives from base station 120 the configuration of two PDCCH search spaces 540 and 550 on two symbols 531 and 532. The configuration indicates that PDCCH search space 540 is configured on symbol 531, and that PDCCH search space 550 is configured on symbol 532. The configuration can also indicate CCE AL of PDCCH search spaces 540 and 550. Alternatively, the configuration indicate that symbol 531 is transmitted in a first beam, and symbol 531 is transmitted in a second beam. User device 140 can search and detect its PDCCHs according to the received configurations of PDCCH search spaces 540 and 550.

Step 1530 includes detecting a control channel on the control resource set according to the configuration of the control resource set. For example, user device 140 can detect its PDCCHs on PDCCH search spaces 540 and 550 according to the received configuration and indications therein. For example, user device 140 can detect its PDCCHs in resource set with localized PDCCH mapping 941 and 942 in FIG. 9 according to the determined indications, including the indication of a starting symbol of the search space in the control resource set of PDCCH candidates 441 and 442, the indication of CCE to CCH mapping, the indication of CCE to REG mapping, the indication of REG/CCE mapping to physical resource elements, the indication of the transmit diversity scheme used by base station 120, the indication of reference signal allocation, the indication of PRB bundling, the indication of a number of symbols, an indication of physical resource blocks (PRBs), and an indication of a starting PRB.

Alternatively, user device 140 can receive from base station 120 one or more of the configurations of the control resource sets as described above with reference to FIGS. 2-13. User device 140 can detect its PDCCHs from base station 120 according to the configurations and indications therein.

Figure 16:
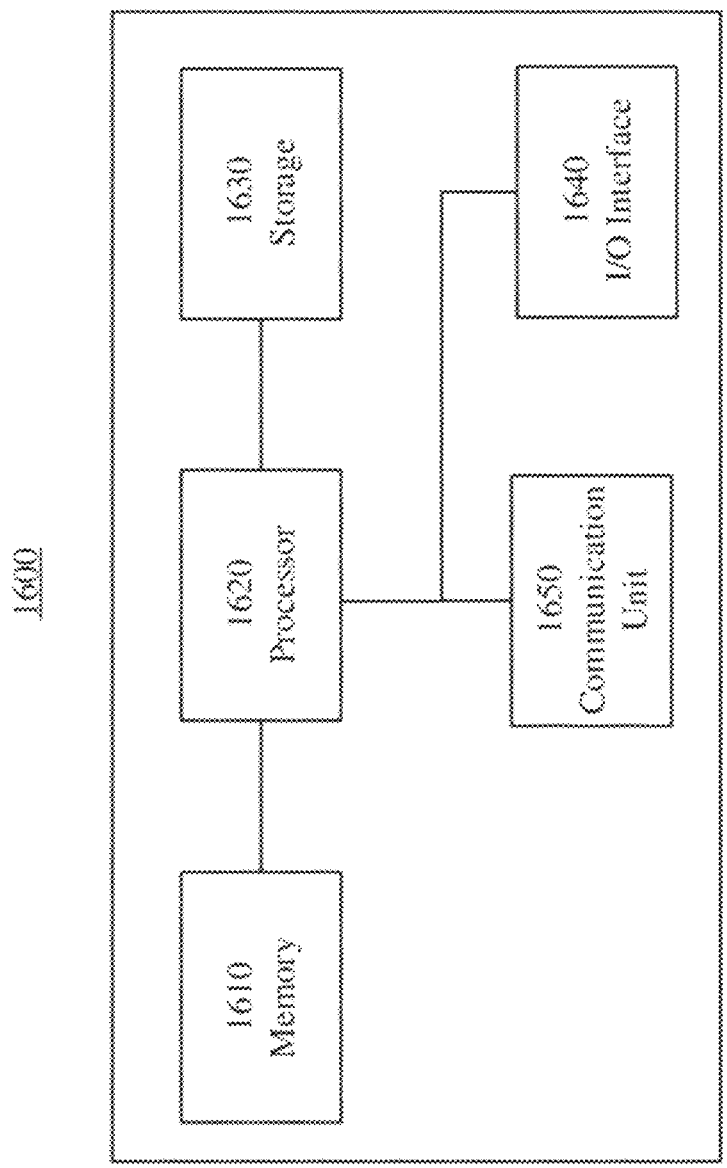
FIG. 16 is a schematic diagram of an exemplary network apparatus for transmitting a control channel in a wireless communication system, according to some embodiments of the present application.

FIG. 16 is a schematic diagram of an exemplary network apparatus 1600 for transmitting a control channel in a wireless communication system, according to some embodiments of the present application. Network apparatus 1600 includes a memory 1610, a processor 1620, a storage 1630, an I/O interface 1640, and a communication unit 1650. One or more of these elements of network apparatus 1600 may be included for configuring and/or transmitting control channels in a wireless communication system. These elements may be configured to transfer data and send or receive instructions between or among each other. Base station 120 shown in FIG. 1 may be configured as network apparatus 1600. Network apparatus 1600 can be a base station, a relay station, a remote radio unit, a network node, or a home base station in a wireless communication system.

Processor 1620 includes any appropriate type of general-purpose or special-purpose microprocessor, digital signal processor, or microcontroller. Processor 1620 can be one of processors in base station 120. Memory 1610 and storage 1630 may include any appropriate type of mass storage provided to store any type of information that processor 1620 may need to operate. Memory 1610 and storage 1630 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 1610 and/or storage 1630 may be configured to store one or more programs for execution by processor 1620 to transmit a configuration of a control resource set in a wireless communication system, as disclosed herein.

Memory 1610 and/or storage 1630 may be further configured to store information and data used by processor 1620. For instance, memory 1610 and/or storage 1630 may be configured to store potential starting symbols of search spaces, transmit diversities, localized and/or distributed mapping, frequency-first and/or time-first mapping for user devices.

I/O interface 1640 may be configured to facilitate the communication between network apparatus 1600 and other apparatuses. For example, I/O interface 1640 may receive a signal from another apparatus (e.g., a computer) including system configuration information for network apparatus 1600. I/O interface 1640 may also output data of transmitting statistics to other apparatuses.

Communication unit 1650 may include one or more cellular communication modules, including, for example, a 5G radio system, a Long-Term Evolution (LTE), a High Speed Packet Access (HSPA), a Wideband Code-Division Multiple Access (WCDMA), and/or a Global System for Mobile communication (GSM) communication module.

Processor 1620 can be configured to transmit a configuration of a control resource set by communication unit 1650. For example, as shown in FIG. 1, processor 1620 can be configured to transmit a configuration of a control resource set to user device 140. Processor 1620 can configure the control resource set in a control region including time and frequency resources. For example, as shown in FIG. 4, processor 1620 can configure PDCCH candidates 441 and 442 for PDCCH transmission in PDCCH region 460 that is over the full bandwidth on symbols 431 and 431.

Processor 1620 can also be configured to transmit a configuration of a search space to a user device by communication unit 1650. For example, as shown in FIG. 5, processor 1620 can be configured to transmit the configuration of two PDCCH search spaces 540 and 550 on two symbols 531 and 532 to user device 140. The configuration indicates that PDCCH search space 540 is configured on symbol 531, and that PDCCH search space 550 is configured on symbol 532. The configuration may also indicate that symbol 531 is transmitted in a first beam, and symbol 531 is transmitted in a second beam.

Processor 1620 can be further configured to transmit a control channel on the control resource set according to the configuration of the control resource set by communication unit 1650. For example, after processor 1620 configures a control resource set as described above, processor 1620 can be configured to transmit a PDCCH according to the configuration of the control resource set. User device 140 can detect and receive its PDCCH according to the received configuration of the control resource set from base station 120.

In some embodiments, processor 1620 can be configured to transmit the configuration of the control resource set that includes an indication of a starting symbol of a search space in the control resource set. For example, as shown in FIG. 4, processor 1620 can be configured to transmit the configuration of the control resource set of PDCCH candidates 441 and 442 with an indication that symbol 431 is the starting symbol of the search space in the control resource set.

In some embodiments processor 1620 can be configured to transmit the configuration of the control resource set that includes an indication of CCE to CCH mapping. For example, as shown in FIG. 10, processor 1620 can be configured to transmit the configuration of the control resource set that includes an indication that four REGs of CCE 1011 and four REGs of CCE 1012 are mapped to respective four physical REGs in the frequency domain first, i.e. the frequency-first CCE-to-CCH mapping. In another aspect, processor 1620 can be configured to transmit the configuration of the control resource set that includes an indication that two CCEs are mapped to respective physical REGs in the time domain first, i.e. the time-first CCE-to-CCH mapping.

In some embodiments, processor 1620 can be configured to transmit the configuration of the control resource set that includes an indication of CCE-to-REG mapping. For example, as shown in FIG. 10, processor 1620 can be configured to transmit the configuration of the control resource set that includes an indication that the four REGs of CCE 1012 are mapped to physical REGs by the time-first CCE-to-REG mapping. In another aspect, processor 1620 may be configured to transmit the configuration of the control resource set that includes an indication that a plurality of REGs of a CCE are mapped to physical REGs by the frequency-first CCE-to-REG mapping.

In some embodiments, processor 1620 can be configured to transmit the configuration of the control resource set that includes an indication of REG/CCE mapping to physical resource elements. For example, as shown in FIG. 10, processor 1620 can be configured to transmit the configuration of the control resource set that includes an indication that the four REGs of CCE 1011 and the four REGs of CCE 1012 are separately mapped to respective four physical REGs, i.e., a distributed REG/CCE to physical resource elements mapping. As another example, as shown in FIG. 11, processor 1620 can be configured to transmit the configuration of the control resource set that includes an indication that the four REGs of CCE 1111 and the four REGs of CCE 1112 are continuously mapped to respective four physical REGs, i.e., a localized REG/CCE to physical resource elements mapping.

Alternatively, processor 1620 can be configured to transmit the configuration of the control resource set that includes an indication of a transmit diversity scheme. For example, processor 1620 can be configured to transmit the configuration of the control resource set that includes an indication that the transmit diversity scheme is a space frequency block code (SFBC). Accordingly, processor 1620 can be configured to transmit PDCCH to user device 140 using the SFBC transmit diversity scheme.

In some embodiments, processor 1620 can be configured to transmit the configuration of the control resource set that includes an indication of reference signal allocation. For example, processor 1620 can be configured to transmit the configuration of the control resource set that includes an indication that periodic channel status information reference signals (CSI-RS) is allocated, and that the tenth antenna port is used to transmit the CSI-RS. The antenna port of the CSI-RS is associated with the pattern of CSI-RS signals on frequency and time domains.

In some embodiments, processor 1620 can be configured to transmit the configuration of the control resource set that includes an indication of physical resource block (PRB) bundling. For example, as shown in FIG. 6, processor 1620 can be configured to transmit the configuration of the control resource set with an indication that two REGs 641 and 642 are bundled. In other words, processor 1620 can be configured to indicate a size of PRB bundling equal to two REGs. When user device 140 receives this indication from the configuration of the control resource set, user device 140 can detect PDCCH on the two bundled REGs 641 and 642. As another example shown in FIG. 10, processor 1620 can be configured to transmit the configuration of the control resource set with an indication that four REGs are bundled across time and frequency domains. User device 140 can detect PDCCH on the four bundled REGs accordingly after receiving the configuration of the control resource set.

Alternatively, processor 1620 can be configured to transmit the configuration of the control resource set that includes an indication of a number of symbols. For example, as shown in FIG. 4, processor 1620 can be configured to transmit the configuration of the control resource set that includes an indication that two symbols 431 and 432 are included in the control resource set. As another example in FIG. 5, processor 1620 can be configured to transmit the configuration of the control resource set that includes an indication that three symbols 531, 532, and 533 are included in the control resource set.

In some embodiments, processor 1620 can be configured to transmit the configuration of the control resource set that includes an indication of physical resource blocks (PRBs). For example, as shown in FIG. 11, processor 1620 can be configured to transmit the configuration of the control resource set that includes an indication that eight PRBs are used for transmission of the control resource set.

Processor 1620 can also be configured to transmit the configuration of the control resource set that includes an indication of a starting PRB. For example, as shown in FIG. 11, processor 1620 can be configured to transmit the configuration of the control resource set that includes an indication the second PRB on symbol 1131 is the starting PRB. User device 140 can detect PDCCH accordingly after receiving the configuration of the control resource set including the indication of the starting PRB.

In some embodiments, processor 1620 can be configured to transmit two configurations of a first control resource set and a second control resource set. The configuration of the second control resource set can include one or more of the above indications included in the configuration of the first control resource set. When processor 1620 is configured to transmit the configuration of the second control resource set, processor 1620 can be configured to transmit one or more control channels according to the configuration of the first control resource set, the configuration of the second resource set, or both of the configurations of the first and second control resource sets. For example, as shown in FIG. 4, processor 1620 can be configured to transmit another configuration of the control resource set of PDCCH candidates 451 and 452 while it transmits the configuration of the control resource set of PDCCH candidates 441 and 442. Processor 1620 can be configured to transmit one or more PDCCHs in either one or both of the control resource set of PDCCH candidates 441 and 442 and the control resource set of PDCCH candidates 451 and 452 according to the configurations of the first and second control resource sets.

In some embodiments, processor 1620 can be configured to transmit the configuration of the first control resource set and the configuration of the second control resource set that include at least one common indication including the indication of CCE-to-CCH mapping, the indication of CCE-to-REG mapping, the indication of REG/CCE mapping to physical resource elements, the indication of a transmit diversity scheme, the indication of reference signal allocation, the indication of PRB bundling, the indication of the number of symbols, the indication of the starting symbol of the search space in the first control resource set, the indication of the number of PRBs, or the indication of a starting PRB.

For example, as shown in FIG. 4, processor 1620 can be configured to transmit the configuration of the control resource set of PDCCH candidates 441 and 442 and the configuration of the control resource set of PDCCH candidates 451 and 452 that include at least one common indication including the indication of frequency-first CCE-to-CCH mapping, the indication of frequency-first CCE-to-REG mapping, the indication of localized REG/CCE mapping to physical resource elements, the indication of PRB bundling of 2 RGEs, the indication of the number of symbols, the indication of the starting symbol of the search space in the control resource set, the indication of the number of PRBs.

In some embodiments, processor 1620 can be configured to transmit the configuration of the first control resource set and the configuration of the second control resource set that are on different symbols. For example, as shown in FIG. 5, processor 1620 can be configured to transmit two configurations of PDCCH search spaces 540 and 550 on symbol 531 and 532, respectively.

Alternatively, processor 1620 can be configured to transmit the configuration of the first control resource set and the configuration of the second control resource set that are on at least one common symbol. For example, as shown in FIG. 4, processor 1620 can be configured to transmit the configuration of the control resource set of PDCCH candidates 441 and 442 and the configuration of the second control resource set of PDCCH candidates 451 and 452 on two common symbols 431 and 432.

In some embodiments, processor 1620 can be configured to transmit the configuration of the first control resource set and the configuration of the second control resource set that overlap in frequency. For example, as shown in FIG. 8, processor 1620 can be configured to transmit the configurations of resource set with localized PDCCH mapping 840 and resource set with distributed PDCCH mapping 850 that overlap in frequency.

Alternatively, processor 1620 can be configured to transmit the configuration of the first control resource set and the configuration of the second control resource set that do not overlap in frequency. For example, as shown in FIG. 4, processor 1620 can be configured to transmit the configuration of the control resource set of PDCCH candidates 441 and 442 and the configuration of the control resource set of PDCCH candidates 451 and 452 that do not overlap in frequency.

In some embodiments, processor 1620 can be configured to transmit the configurations of the first control resource set and the second control resource set that both include the indications of CCE to REG mapping being the frequency-first mapping and the indications of CCE to CCH mapping being the frequency-first mapping. In addition, the first control resource set and the second control resource set are configured on the same set of symbols. For example, as shown in FIG. 13, processor 1620 can be configured to transmit the configurations of resource set with F+F distributed PDCCH mapping 1351 and resource set with F+F localized PDCCH mapping 1341 that both include the indications of CCE to REG mapping being the frequency-first mapping and the indications of CCE to CCH mapping being the frequency-first mapping. In addition, resource set with F+F distributed PDCCH mapping 1351 and resource set with F+F localized PDCCH mapping 1341 are configured on the same symbol 1331.

In some embodiments, processor 1620 can be configured to transmit the configurations of the first control resource set and the second control resource set that both include the indications of CCE to REG mapping being the time-first mapping and the indications of CCE to CCH mapping being the frequency-first mapping. In addition, the first control resource set and the second control resource set are configured on the same set of symbols. For example, as shown in FIG. 13, processor 1620 can be configured to transmit the configurations of resource set with T+F localized PDCCH mapping 1342 and resource set with T+F distributed PDCCH mapping 1352 that both include the indications of CCE to REG mapping being the time-first mapping and the indications of CCE to CCH mapping being the frequency-first mapping. In addition, resource set with T+F localized PDCCH mapping 1342 and resource set with T+F distributed PDCCH mapping 1352 are configured on the same set of symbols 1332 and 1333.

In some embodiments, processor 1620 can be configured to transmit the configuration of the first control resource set including the indication of CCE to REG mapping being the frequency-first mapping and the indication of CCE to CCH mapping being the frequency-first mapping. Processor 1620 can also be configured to transmit the configuration of the second control resource set including: the indication of CCE to REG mapping being the time-first mapping and the indication of CCE to CCH mapping being the frequency-first mapping. In addition, the first control resource set and the second control resource set are configured on different sets of symbols. For example, as shown in FIG. 13, processor 1620 can be configured to transmit the configurations of resource set with F+F distributed PDCCH mapping 1351 and resource set with T+F distributed PDCCH mapping 1352 that both include the indications of CCE to CCH mapping being the frequency-first mapping. The configuration of resource set with F+F distributed PDCCH mapping 1351 includes the indication of CCE to REG mapping being the time-first mapping. Resource set with T+F distributed PDCCH mapping 1352 includes the indication of CCE to REG mapping being the frequency-first mapping. In addition, resource set with F+F distributed PDCCH mapping 1351 and resource set with T+F distributed PDCCH mapping 1352 are respectively configured on a set of symbol 1331 and another set of symbols 1332 and 1333.

In some embodiments, processor 1620 can be configured to transmit a configuration of a first search space to a first user device and to transmit a configuration of a second search space to a second user device. The first search space and the second search space are on a control resource set. The first search space and the second search space include a common CCE to CCH mapping, a common CCE to REG mapping, or a common REG/CCE mapping. For example, processor 1620 can be configured to transmit a configuration of a first search space on resource set with localized PDCCH mapping 840 of FIG. 8 to user device 140 and transmit a configuration of a second search space on the same resource set to user device 160. The first search space for user device 140 includes PDCCH candidate of CCE AL=1 and 2 on resource set with localized PDCCH mapping 840. The second search space for user device 160 includes PDCCH candidate of CCE AL=4 and 8 on resource set with localized PDCCH mapping 840. The first search space and the second search space on resource set with localized PDCCH mapping 840 include a common CCE to CCH mapping, a common CCE to REG mapping, or a common REG/CCE mapping, as described above for resource set with localized PDCCH mapping 840.

In some embodiments, processor 1620 can be configured to transmit a configuration of a first search space and a configuration of a second search space to a user device. The first search space and the second search space are on different control resource sets. The first search space and the second search space are on one or more common symbols. For example, processor 1620 can be configured to transmit a configuration of a first search space on resource set with T+F localized PDCCH mapping 1241 of FIG. 12 and another configuration of a second search space on resource set with T+F distributed PDCCH mapping 1251 of FIG. 12 to user device 140. The first and second search spaces are on different control resource sets, but are on common symbols 1231 and 1232.

In some embodiments, processor 1620 can be configured to transmit a configuration of a first search space and a configuration of a second search space to a user device. The first search space and the second search space are on different control resource sets. The first search space and the second search space are on one or more different symbols. For example, processor 1620 can be configured to transmit a configuration of a first search space on resource set with F+F distributed PDCCH mapping 1351 of FIG. 13 and a configuration of a second search space on resource set with T+F distributed PDCCH mapping 1351 of FIG. 13 to user device 140. The first and second search spaces are on different control resource sets, and are respectively on symbol 1331 and symbols 1332 and 1333.

Figure 17:
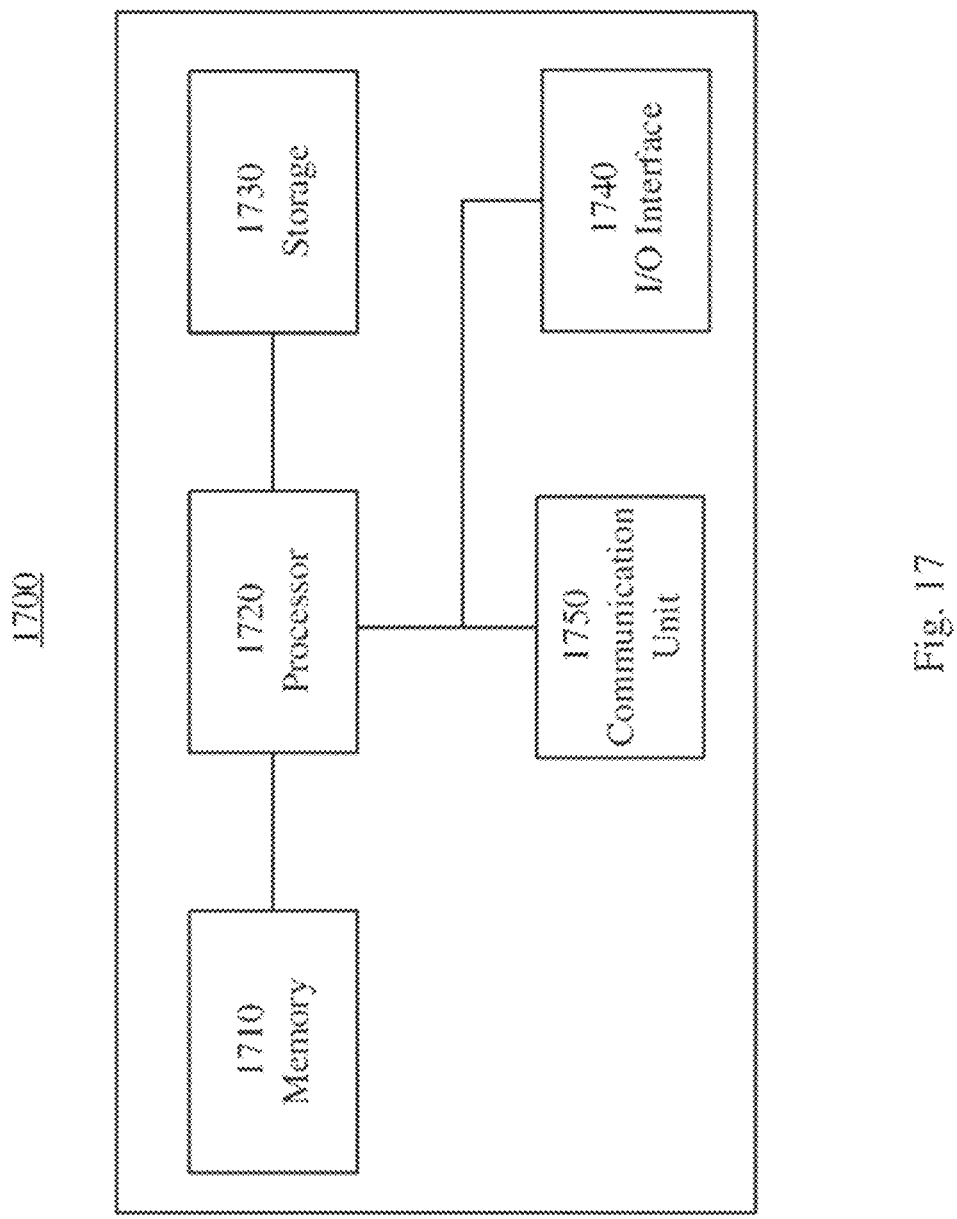
FIG. 17 is a schematic diagram of an exemplary user device for detecting a control channel in a wireless communication system, according to some embodiments of the present application.

FIG. 17 is a schematic diagram of an exemplary user device 1700 for detecting a control channel in a wireless communication system, according to some embodiments of the present application. User device 140 or 160 shown in FIG. 1 may be configured as user device 1700. User device 1700 includes a memory 1710, a processor 1720, a storage 1730, an I/O interface 1740, and a communication unit 1750. One or more of these elements of user device 1700 may be included for receiving a configuration of control channels and/or detecting control channels in a wireless communication system. These elements may be configured to transfer data and send or receive instructions between or among each other.

Processor 1720 includes any appropriate type of general-purpose or special-purpose microprocessor, digital signal processor, or microcontroller. Memory 1710 and storage 1730 may be configured as described above for memory 1610 and storage 1630. Memory 1710 and/or storage 1730 may be further configured to store information and data used by processor 1720. For instance, memory 1710 and/or storage 1730 may be configured to store received configurations of control resource sets and indications therein for user device 1700.

I/O interface 1740 may be configured to facilitate the communication between user device 1700 and other apparatuses. For example, I/O interface 1740 may receive a signal from another apparatus (e.g., a computer) including system configuration information for user device 1700. I/O interface 1740 may also output data of detecting statistics to other apparatuses.

Communication unit 1750 may include one or more cellular communication modules, including, for example, a 5G radio system, a Long-Term Evolution (LTE), a High Speed Packet Access (HSPA), a Wideband Code-Division Multiple Access (WCDMA), and/or a Global System for Mobile communication (GSM) communication module.

Processor 1720 can be configured to receive a configuration of a control resource set by communication unit 1750. For example, as shown in FIG. 4, processor 1720 can be configured to receive the configuration of the control resource set of PDCCH candidates 441 and 442 for PDCCH transmission in PDCCH region 460 from base station 120 by communication unit 1750. Processor 1720 can be further configured to determine one or more indications from the configuration, including the indication of a starting symbol of the search space in the control resource set of PDCCH candidates 441 and 442, the indication of CCE to CCH mapping, the indication of CCE to REG mapping, the indication of REG/CCE mapping to physical resource elements, the indication of the transmit diversity scheme used by base station 120, the indication of reference signal allocation, the indication of PRB bundling, the indication of a number of symbols, an indication of physical resource blocks (PRBs), and an indication of a starting PRB.

As noted above, base station 120 may transmit the configuration of the control resource set as described above with reference to FIGS. 2-13. Processor 1720 can be configured to detect and receive its PDCCHs in accordance with the configuration of the control resource set from base station 120.

Processor 1720 can also be configured to receive a configuration of a search space to a user device by communication unit 1750. For example, as shown in FIG. 5, processor 1720 can be configured to receive from base station 120 the configuration of two PDCCH search spaces 540 and 550 on two symbols 531 and 532 by communication unit 1750. The configuration indicates that PDCCH search space 540 is configured on symbol 531, and that PDCCH search space 550 is configured on symbol 532. The configuration can also indicate CCE AL of PDCCH search spaces 540 and 550. Alternatively, the configuration can indicate that symbol 531 is transmitted in beam #1, and symbol 531 is transmitted in beam #2. Processor 1720 can be configured to search and detect its PDCCHs according to the received configurations of PDCCH search spaces 540 and 550.

Processor 1720 can be further configured to detect a control channel on the control resource set according to the configuration of the control resource set. For example, processor 1720 can be configured to detect its PDCCHs on PDCCH search spaces 540 and 550 according to the received configuration and indications therein. For example, processor 1720 can be configured to detect its PDCCHs in resource set with localized PDCCH mapping 941 and 942 in FIG. 9 according to the determined indications, including the indication of a starting symbol of the search space in the control resource set of PDCCH candidates 441 and 442, the indication of CCE to CCH mapping, the indication of CCE to REG mapping, and the indication of REG/CCE mapping to physical resource elements, the indication of the transmit diversity scheme used by base station 120, the indication of reference signal allocation, the indication of PRB bundling, the indication of a number of symbols, an indication of physical resource blocks (PRBs), and an indication of a starting PRB.

Alternatively, processor 1720 can be configured to receive from base station 120, via communication unit 1750, one or more of the configurations of the control resource sets as described above with reference to FIGS. 2-13. Processor 1720 can be configured to detect its PDCCHs from base station 120 according to the configurations and indications therein.

Another aspect of the disclosure is directed to a non-transitory computer-readable medium storing instructions which, when executed, cause one or more processors to perform methods, consistent with the embodiments disclosed herein. The computer-readable medium may include volatile or non-volatile, magnetic, semiconductor, tape, optical, removable, non-removable, or other types of computer-readable medium or computer-readable storage devices. For example, the computer-readable medium may be a storage device or a memory module having the computer instructions stored thereon, as disclosed. In some embodiments, the computer-readable medium may be a disc or a flash drive having the computer instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. A method for configuring a control resource set and a search space corresponding thereto in a wireless communication system, comprising:
   transmitting an indication of a starting symbol of the search space in the control resource set, an indication of a number of symbols of the control resource set and an indication of control channel element (CCE) to resource element group (REG) mapping of the control resource set, wherein the control resource set is in a control region including time and frequency resources; and
   transmitting a control channel on the control resource set in accordance with the indication of the starting symbol of the search space in the control resource set and the indication of the number of symbols of the control resource set;
   wherein a configuration of the control resource set includes an indication of physical resource block (PRB) bundling in the control resource set, the indication of PRB bundling includes a size of a PRB bundle, the size of a PRB bundle is 6;
   wherein the control resource set is a first control resource set, and the search space is a first search space, the first control resource set and a second control resource set are overlapped, the CCE to REG mapping of the first control resource set is a first mapping mode, the CCE to REG mapping of the second control resource is a second mapping mode;
   when the first mapping mode is time first, the second mapping mode is frequency first and when the first mapping mode is frequency first, the second mapping mode is time first.

2. The method of claim 1, wherein the configuration of the control resource set further includes at least one of following:
   an indication of REG/CCE mapping to physical resource elements,
   an indication of a transmit diversity scheme,
   an indication of reference signal allocation, or
   any combination thereof.

3. The method of claim 1, wherein the CCE to REG mapping includes a localized mapping or a distributed mapping.

4. The method of claim 1, further comprising:
   transmitting a configuration of the second control resource set,
   wherein transmitting the control channel includes transmitting one or more control channels according to the configuration of the first control resource set, the configuration of the second resource set, or both of the configurations of the first and second control resource sets.

5. The method of claim 1, further comprising transmitting an indication of physical resource blocks (PRBs) in the control resource set.

6. A method for a user device in a wireless communication system, comprising:
   receiving an indication of a starting symbol of a search space in a control resource set, an indication of a number of symbols of the control resource set and an indication of control channel element (CCE) to resource element group (REG) mapping of the control resource set, wherein the control resource set is in a control region including time and frequency resources; and
   detecting a control channel on the control resource set in accordance with the indication of the starting symbol of the search space in the control resource set and the indication of the number of symbols of the control resource set;
   wherein a configuration of the control resource set includes an indication of physical resource block (PRB) bundling in the control resource set, the indication of PRB bundling includes a size of a PRB bundle, the size of a PRB bundle is 6;
   wherein the control resource set is a first control resource set, and the search space is a first search space, the first control resource set and a second control resource set are overlapped, the CCE to REG mapping of the first control resource set is a first mapping mode, the CCE to REG mapping of the second control resource is a second mapping mode;
   when the first mapping mode is time first, the second mapping mode is frequency first and when the first mapping mode is frequency first, the second mapping mode is time first.

7. The method of claim 6, wherein the configuration of the control resource set further includes at least one of following:
   an indication of REG/CCE mapping to physical resource elements,
   an indication of a transmit diversity scheme,
   an indication of reference signal allocation, or
   any combination thereof.

8. The method of claim 6, wherein the CCE to REG mapping includes a localized mapping or a distributed mapping.

9. The method of claim 6, further comprising:
   receiving a configuration of the second control resource set,
   wherein detecting the control channel includes detecting one or more control channels according to the configuration of the first control resource set, the configuration of the second resource set, or both of the configurations of the first and second control resource sets.

10. The method of claim 6, further comprising receiving an indication of physical resource blocks (PRBs) in the control resource set.

11. A network apparatus, comprising:
a memory storing instructions; and
a processor communicatively coupled to the memory,
wherein the instructions, when executed by the processor, cause the network apparatus to perform operations including:
transmitting an indication of a starting symbol of the search space in the control resource set, an indication of a number of symbols of the control resource set and an indication of control channel element (CCE) to resource element group (REG) mapping of the control resource set, wherein the control resource set is in a control region including time and frequency resources; and
transmit a control channel on the control resource set according to the indication of the starting symbol of the search space in the control resource set and the indication of the number of symbols of the control resource set;
wherein a configuration of the control resource set includes an indication of physical resource block (PRB) bundling in the control resource set, the indication of PRB bundling includes a size of a PRB bundle, the size of a PRB bundle is 6;
wherein the control resource set is a first control resource set, and the search space is a first search space, the first control resource set and a second control resource set are overlapped, the CCE to REG mapping of the first control resource set is a first mapping mode, the CCE to REG mapping of the second control resource is a second mapping mode;
when the first mapping mode is time first, the second mapping mode is frequency first and when the first mapping mode is frequency first, the second mapping mode is time first.

12. The apparatus of claim 11, wherein the configuration of the control resource set further includes at least one of following:
an indication of REG/CCE mapping to physical resource elements,
an indication of a transmit diversity scheme,
an indication of reference signal allocation, or
any combination thereof.

13. The network apparatus of claim 11, wherein the CCE to REG mapping includes a localized mapping or a distributed mapping.

14. The network apparatus of claim 11, wherein the operations performed by the processor further comprise:
transmitting a configuration of the second control resource set,
wherein transmitting the control channel includes transmitting one or more control channels according to the configuration of the first control resource set, the configuration of the second resource set, or both of the configurations of the first and second control resource sets.

15. The apparatus of claim 11, wherein the operations performed by the processor further comprise transmitting an indication of physical resource blocks (PRBs) in the control resource set.

16. A user device, comprising:
a memory storing instructions; and
a processor communicatively coupled to the memory,
wherein the instructions, when executed by the processor, cause the processor to perform operations including:
receiving an indication of a starting symbol of a search space in a control resource set, an indication of a number of symbols of the control resource set and an indication of control channel element (CCE) to resource element group (REG) mapping of the control resource set, wherein the control resource set is in a control region including time and frequency resources; and
detecting a control channel on the control resource set in accordance with the indication of the starting symbol of the search space in the control resource set and the indication of the number of symbols of the control resource set;
wherein a configuration of the control resource set includes an indication of physical resource block (PRB) bundling in the control resource set, the indication of PRB bundling includes a size of a PRB bundle, the size of a PRB bundle is 6;
wherein the control resource set is a first control resource set, and the search space is a first search space, the first control resource set and a second control resource set are overlapped, the CCE to REG mapping of the first control resource set is a first mapping mode, the CCE to REG mapping of the second control resource is a second mapping mode;
when the first mapping mode is time first, the second mapping mode is frequency first and when the first mapping mode is frequency first, the second mapping mode is time first.

17. The user device of claim 16, wherein the configuration of the control resource set further includes at least one of following:
an indication of REG/CCE mapping to physical resource elements,
an indication of a transmit diversity scheme,
an indication of reference signal allocation, or
any combination thereof.

18. The user device of claim 16, wherein the CCE to REG mapping includes a localized mapping or a distributed mapping.

19. The user device of claim 16, wherein the operations performed by the processor further comprise:
receiving a configuration of the second control resource set,
wherein detecting the control channel includes detecting one or more control channels according to the configuration of the first control resource set, the configuration of the second resource set, or both of the configurations of the first and second control resource sets.

20. The user device of claim 16, wherein operations performed by the processor further comprise receiving:
an indication of physical resource blocks (PRBs) in the control resource set.

* * * * *